US011942618B2

(12) United States Patent
Basu et al.

(10) Patent No.: US 11,942,618 B2
(45) Date of Patent: Mar. 26, 2024

(54) METHODS, SYSTEMS, AND COMPOSITIONS FOR THE LIQUID-PHASE DEPOSITION OF THIN FILMS ONTO THE SURFACE OF BATTERY ELECTRODES

(71) Applicant: Coreshell Technologies, Inc., San Leandro, CA (US)

(72) Inventors: Sourav Basu, Oakland, CA (US); Jonathan Tan, San Leandro, CA (US)

(73) Assignee: CORESHELL TECHNOLOGIES, INCORPORATED, San Leandro, CA (US)

(*) Notice: Subject to any disclaimer, the term of this patent is extended or adjusted under 35 U.S.C. 154(b) by 0 days.

(21) Appl. No.: 17/410,797

(22) Filed: Aug. 24, 2021

(65) Prior Publication Data

US 2022/0045307 A1    Feb. 10, 2022

Related U.S. Application Data

(63) Continuation of application No. 17/232,945, filed on Apr. 16, 2021, now Pat. No. 11,139,460, which is a
(Continued)

(51) Int. Cl.
*B05C 5/00*    (2006.01)
*B05C 3/00*    (2006.01)
(Continued)

(52) U.S. Cl.
CPC ............ *H01M 4/0402* (2013.01); *B05C 5/00* (2013.01); *B05C 9/00* (2013.01); *H01M 4/049* (2013.01);
(Continued)

(58) Field of Classification Search
None
See application file for complete search history.

(56) References Cited

U.S. PATENT DOCUMENTS 4,130,446 A * 12/1978 Murakami ............. C23C 22/86
148/262
5,108,552 A * 4/1992 Desthomas ............ C25D 5/00
205/82
(Continued)

FOREIGN PATENT DOCUMENTS

CN     111095627        5/2020
EP      3642896         4/2020
(Continued)

OTHER PUBLICATIONS

"International Application Serial No. PCT US2020 019717, International Search Report dated Jul. 22, 2020", 4 pages.
(Continued)

*Primary Examiner* — Dah-Wei D. Yuan
*Assistant Examiner* — Stephen A Kitt
(74) *Attorney, Agent, or Firm* — SCHWEGMAN LUNDBERG & WOESSNER, P.A.

(57) ABSTRACT

Methods, systems, and compositions for the liquid-phase deposition (LPD) of thin films. The thin films can be coated onto the surface of porous components of electrochemical devices, such as battery electrodes. Embodiments of the present disclosure achieve a faster, safer, and more cost-effective means for forming uniform, conformal layers on non-planar microstructures than known methods. In one aspect, the methods and systems involve exposing the component to be coated to different liquid reagents in sequential processing steps, with optional intervening rinsing and drying steps. Processing may occur in a single reaction chamber or multiple reaction chambers.

20 Claims, 7 Drawing Sheets

Related U.S. Application Data continuation of application No. 16/244,024, filed on Jan. 9, 2019, now Pat. No. 10,985,360, which is a continuation of application No. PCT/US2018/038612, filed on Jun. 20, 2018.

(60) Provisional application No. 62/522,470, filed on Jun. 20, 2017.

(51) Int. Cl.

| | | |
|---|---|---|
| *B05C 9/00* | (2006.01) | |
| *C23C 18/16* | (2006.01) | |
| *H01M 4/04* | (2006.01) | |
| *H01M 4/139* | (2010.01) | |
| *H01M 6/00* | (2006.01) | |
| *H01M 10/0525* | (2010.01) | |
| *B05D 1/02* | (2006.01) | |
| *B05D 1/18* | (2006.01) | |
| *B05D 1/26* | (2006.01) | |
| *B05D 1/28* | (2006.01) | |
| *B05D 1/38* | (2006.01) | |
| *H01M 4/36* | (2006.01) | |
| *H01M 4/38* | (2006.01) | |
| *H01M 10/04* | (2006.01) | |
| *H01M 10/0587* | (2010.01) | |

(52) U.S. Cl.
CPC .......... *H01M 4/139* (2013.01); *H01M 6/005* (2013.01); *H01M 10/0525* (2013.01); *B05C 3/00* (2013.01); *B05D 1/02* (2013.01); *B05D 1/18* (2013.01); *B05D 1/26* (2013.01); *B05D 1/28* (2013.01); *B05D 1/38* (2013.01); *C23C 18/1655* (2013.01); *H01M 4/36* (2013.01); *H01M 4/362* (2013.01); *H01M 4/38* (2013.01); *H01M 10/0409* (2013.01); *H01M 10/0587* (2013.01)

(56) References Cited

U.S. PATENT DOCUMENTS

| | | | |
|---|---|---|---|
| 5,516,704 A | 5/1996 | Yoshida | |
| 5,863,603 A | 1/1999 | Sandhu et al. | |
| 6,596,148 B1 * | 7/2003 | Belongia | C25D 21/18 210/195.2 |
| 7,521,097 B2 | 4/2009 | Horne et al. | |
| 8,192,789 B2 | 6/2012 | Albano et al. | |
| 10,033,041 B2 | 7/2018 | Perng et al. | |
| 10,062,922 B2 | 8/2018 | Kumar et al. | |
| 10,243,197 B2 | 3/2019 | Cho et al. | |
| 10,290,864 B2 | 5/2019 | Burshtain et al. | |
| 10,497,927 B2 | 12/2019 | Xiao | |
| 10,505,219 B2 | 12/2019 | Singh et al. | |
| 10,923,726 B2 | 2/2021 | Cho et al. | |
| 10,985,360 B2 | 4/2021 | Basu et al. | |
| 11,139,460 B2 | 10/2021 | Basu et al. | |
| 11,223,036 B2 | 1/2022 | Liu et al. | |
| 11,349,111 B2 | 5/2022 | Singh et al. | |
| 11,453,948 B2 | 9/2022 | Gallant et al. | |
| 11,588,142 B2 | 2/2023 | Basu et al. | |
| 2001/0042686 A1 * | 11/2001 | Taniguchi | C25D 21/14 428/606 |
| 2005/0233156 A1 | 10/2005 | Senzaki et al. | |
| 2005/0287440 A1 | 12/2005 | Chang et al. | |
| 2006/0263687 A1 | 11/2006 | Leitner et al. | |
| 2007/0026156 A1 * | 2/2007 | Mandai | G11B 5/842 118/66 |
| 2008/0145755 A1 | 6/2008 | Iacovangelo et al. | |
| 2009/0246908 A1 | 10/2009 | Basol et al. | |
| 2009/0297696 A1 | 12/2009 | Pore et al. | |
| 2010/0193365 A1 * | 8/2010 | Lopatin | H01M 4/661 204/203 |
| 2010/0330425 A1 | 12/2010 | Lopatin et al. | |
| 2011/0159365 A1 | 6/2011 | Loveness et al. | |
| 2011/0159377 A1 | 6/2011 | Lee et al. | |
| 2011/0311867 A1 | 12/2011 | Wakizaka et al. | |
| 2012/0034767 A1 | 2/2012 | Xiao et al. | |
| 2012/0104204 A1 | 5/2012 | Hung | |
| 2012/0295038 A1 | 11/2012 | Ma et al. | |
| 2013/0248773 A1 | 9/2013 | Chang et al. | |
| 2013/0285597 A1 | 10/2013 | Goldstein | |
| 2013/0330472 A1 | 12/2013 | Honda et al. | |
| 2014/0125292 A1 | 5/2014 | Best et al. | |
| 2014/0234715 A1 | 8/2014 | Fasching et al. | |
| 2015/0147471 A1 | 5/2015 | Yamada | |
| 2015/0148557 A1 | 5/2015 | Lee et al. | |
| 2015/0162602 A1 | 6/2015 | Dadheech et al. | |
| 2015/0364791 A1 | 12/2015 | Vu et al. | |
| 2016/0020449 A1 | 1/2016 | Hamers et al. | |
| 2016/0090652 A1 | 3/2016 | Clark | |
| 2016/0126582 A1 | 5/2016 | Xiao et al. | |
| 2016/0254572 A1 | 9/2016 | Yu et al. | |
| 2016/0258079 A1 * | 9/2016 | Sweeney | B65G 49/02 |
| 2016/0294028 A1 | 10/2016 | Ye | |
| 2016/0351943 A1 | 12/2016 | Albano et al. | |
| 2016/0351973 A1 | 12/2016 | Albano et al. | |
| 2017/0047575 A1 | 2/2017 | Tsuji et al. | |
| 2017/0104204 A1 | 4/2017 | Zhamu et al. | |
| 2017/0170477 A1 | 6/2017 | Sakshaug et al. | |
| 2017/0207451 A1 | 7/2017 | Burshtain et al. | |
| 2017/0331156 A1 | 11/2017 | Visco et al. | |
| 2017/0352883 A1 | 12/2017 | Cho et al. | |
| 2018/0375089 A1 | 12/2018 | Gonser et al. | |
| 2019/0044151 A1 | 2/2019 | Elam et al. | |
| 2019/0393478 A1 | 12/2019 | Basu et al. | |
| 2020/0161635 A1 | 5/2020 | Liu et al. | |
| 2021/0242443 A1 | 8/2021 | Basu et al. | |
| 2021/0242454 A1 | 8/2021 | Basu et al. | |
| 2021/0257604 A1 | 8/2021 | Basu et al. | |
| 2022/0320479 A1 | 10/2022 | Basu et al. | |
| 2022/0328812 A1 | 10/2022 | Basu et al. | |

FOREIGN PATENT DOCUMENTS

| | | |
|---|---|---|
| JP | H1079246 | 3/1998 |
| JP | 2012516941 | 7/2012 |
| JP | 2016521906 | 7/2016 |
| JP | 2020524890 A | 8/2020 |
| KR | 20200020713 | 2/2020 |
| WO | WO-2010090956 A2 | 8/2010 |
| WO | 2017093460 | 6/2017 |
| WO | 2018237083 | 12/2018 |
| WO | 2021096786 | 5/2021 |
| WO | 2021101915 | 5/2021 |

OTHER PUBLICATIONS

"International Application Serial No. PCT US2020 019717, Written Opinion dated Jul. 22, 2020", 11 pgs.

"International Application Serial No. PCT US2020 021995, International Search Report dated May 15, 2020", 3 pgs.

"International Application Serial No. PCT US2020 021995, Written Opinion dated May 15, 2020", 11 pgs.

"U.S. Appl. No. 16/244,024, Notice of Allowance dated Mar. 10, 2021", 9 pgs.

"International Application Serial No. PCT US2018 038612, International Preliminary Report on Patentability dated Jan. 2, 2020", 12 pgs.

"International Application Serial No. PCT US2018 038612, International Search Report dated Nov. 5, 2018", 4 pgs.

"International Application Serial No. PCT US2018 038612, Written Opinion dated Nov. 5, 2018", 10 pgs.

"U.S. Appl. No. 16/244,024, Non Final Office Action dated Mar. 15, 2019", 11 pgs.

"U.S. Appl. No. 16/244,024, Non Final Office Action dated Dec. 17, 2019", 12 pgs.

"U.S. Appl. No. 16/244,024, Non Final Office Action dated Dec. 1, 2020", 15 pgs.

(56) References Cited

OTHER PUBLICATIONS

"U.S. Appl. No. 16/244,024, Response filed Jun. 15, 2019 to Non Final Office Action dated Mar. 15, 2019", 14 pgs.
"U.S. Appl. No. 16/244,024, Response filed Feb. 10, 2020 to Non Final Office Action dated Dec. 17, 2019", 13 pgs.
"U.S. Appl. No. 16/244,024, Response filed Feb. 13, 2021 to Non Final Office Action dated Dec. 1, 2020", 13 pgs.
"U.S. Appl. No. 16/244,024, Final Office Action dated Jul. 16, 2019", 13 pgs.
"U.S. Appl. No. 16/244,024, Final Office Action U.S. Appl. Apr. 7, 2020", 13 pgs.
"U.S. Appl. No. 16/244,024, Response filed Oct. 16, 2019 to Final Office Action dated Jul. 16, 2019", 13 pgs.
"U.S. Appl. No. 16/244,024, Response filed May 15, 2020 to Final Office Action dated Apr. 7, 2020", 13 pgs.
"U.S. Appl. No. 16/244,024, Examiner Interview Summary dated May 22, 2019", 3 pgs.
"U.S. Appl. No. 16/244,024, Examiner Interview Summary dated May 5, 2020", 3 pgs.
"U.S. Appl. No. 16/244,024, Examiner Interview Summary dated Jan. 27, 2021", 2 pgs.
"U.S. Appl. No. 16/244,024, Advisory Action dated Jun. 2, 2020", 3 pgs.
"U.S. Appl. No. 16/244,024, Response filed Jun. 7, 2020 to Advisory Action dated Jun. 2, 2020", 14 pgs.
"International Application Serial No. PCT US2020 059590, International Search Report dated Feb. 4, 2021", 3 pgs.
"International Application Serial No. PCT US2020 059590, Written Opinion dated Feb. 4, 2021", 8 pgs.
"European Application Serial No. 18820797.1, Extended European Search Report dated Feb. 25, 2021", 9 pgs.
"U.S. Appl. No. 17/232,945, Preliminary Amendment filed Apr. 30, 2021", 3 pgs.
"International Application Serial No. PCT US2020 060930, International Search Report dated Mar. 19, 2021", 4 pgs.
"International Application Serial No. PCT US2020 060930, Written Opinion dated Mar. 19, 2021", 4 pgs.
"International Application Serial No. PCT US2020 060930, Invitation to Pay Additional Fees dated Jan. 12, 2021", 2 pgs.
"U.S. Appl. No. 17/232,945, Non Final Office Action dated Jun. 11, 2021", 6 pages.
"U.S. Appl. No. 16/950,922, Preliminary Amendment filed May 3, 2021", 9 pgs.
"U.S. Appl. No. 17/232,945, Response filed Jun. 22, 2021 to Non Final Office Action dated Jun. 11, 2021", 9 pages.
"U.S. Appl. No. 17/098,205, Preliminary Amendment filed Apr. 27, 2021", 11 pgs.
"U.S. Appl. No. 17/232,945, Notice of Allowance dated Aug. 20, 2021", 8 pgs.
"U.S. Appl. No. 17/232,945, Notice of Allowability dated Aug. 27, 2021", 2 pgs.
"Japanese Application Serial No. 2019-571472, Notification of Reasons for Refusal dated Oct. 26, 2021", with English translation, 7 pages.
"Korean Application Serial No. 10-2019-7037281, Notice of Preliminary Rejection dated Oct. 29, 2021", with English translation, 5 pages.
Ban, Chunmei, "Molecular Layer Deposition for Surface Modification of Lithium-Ion Battery Electrodes", Adv. Mater. Interfaces 2016, 1600762, (2016), 1-12.
"Korean Application Serial No. 10-2019-7037281, Response filed Dec. 29, 2021 to Notice of Preliminary Rejection dated Oct. 29, 2021", with English claims, 25 pages.
"Japanese Application Serial No. 2019-571472, Response filed Mar. 1, 2022 to Notification of Reasons for Refusal dated Oct. 26, 2021", with English claims, 14 pages.
"U.S. Appl. No. 16/950,922, Final Office Action dated Apr. 3, 2023", 8 pgs.

"U.S. Appl. No. 16/950,922, Non Final Office Action dated Oct. 18, 2022", 8 pgs.
"U.S. Appl. No. 16/950,922, Response filed Jan. 18, 2023 to Non Final Office Action dated Oct. 18, 2022", 13 pgs.
"U.S. Appl. No. 17/098,205, Final Office Action dated Jun. 6, 2023", 8 pgs.
"U.S. Appl. No. 17/098,205, Response filed Apr. 20, 2023 to Non Final Office Action dated Jan. 20, 2023", 16 pgs.
"U.S. Appl. No. 17/848,707, Final Office Action dated Apr. 20, 2023", 8 pgs.
"U.S. Appl. No. 17/848,707, Non Final Office Action dated Jan. 5, 2023", 8 pgs.
"U.S. Appl. No. 17/848,707, Response filed Apr. 5, 2023 to Non Final Office Action dated Jan. 5, 2023", 10 pgs.
"U.S. Appl. No. 17/848,707, Response filed Jul. 20, 2023 to Final Office Action dated Apr. 20, 2023", 10 pgs.
"U.S. Appl. No. 17/848,749, Corrected Notice of Allowability dated Nov. 3, 2022", 3 pgs.
"U.S. Appl. No. 17/848,749, Non Final Office Action dated Aug. 24, 2022".
"U.S. Appl. No. 17/848,749, Notice of Allowance dated Oct. 24, 2022", 8 pgs.
"U.S. Appl. No. 17/848,749, Response filed Sep. 8, 2022 to Non Final Office Action dated Aug. 24, 2022", 8 pgs.
"Chinese Application Serial No. 201880040441.0, Response filed Jun. 2, 2023 to Office Action dated Jan. 20, 2023", with English claims, 28 pages.
"Japanese Application Serial No. 2019-571472, Examiners Decision of Final Refusal dated May 10, 2022", w/ English translation, 4 pgs.
"Japanese Application Serial No. 2019-571472, Response filed Sep. 6, 2022 to Examiners Decision of Final Refusal dated May 10, 2022", 15 pgs.
"Korean Application Serial No. 10-2019-7037281, Notice of Preliminary Rejection dated May 31, 2022", W/English Translation, 13 pgs.
"Korean Application Serial No. 10-2019-7037281, Response filed Aug. 31, 2022 to Notice of Preliminary Rejection dated May 31, 2022", W/ English Claims, 21 pgs.
"Chinese Application Serial No. 201880040441.0, Office Action dated Nov. 15, 2023", w/ English Translation, 69 pgs.
"U.S. Appl. No. 16/950,922, Corrected Notice of Allowability dated Jan. 5, 2024", 2 pgs.
"U.S. Appl. No. 17/098,205, Notice of Allowance dated Jan. 12, 2024", 6 pgs.
"U.S. Appl. No. 17/098,205, Response filed Dec. 15, 2023 to Non Final Office Action dated Sep. 15, 2023", 16 pgs.
"U.S. Appl. No. 17/848,707, Examiner Interview Summary dated Nov. 9, 2023", 2 pgs.
"U.S. Appl. No. 17/848,707, Final Office Action dated Nov. 21, 2023", 7 pgs.
"U.S. Appl. No. 17/848,707, Response filed Oct. 30, 2023 to Non Final Office Action dated Jul. 28, 2023", 14 pgs.
"U.S. Appl. No. 16/950,922, Response filed Jul. 21, 2023 to Final Office Action dated Apr. 3, 2023", 10 pgs.
"U.S. Appl. No. 17/848,707, Non Final Office Action dated Jul. 28, 2023", 6 pgs.
"U.S. Appl. No. 16/950,922, Notice of Allowance dated Aug. 31, 2023", 8 pgs.
"U.S. Appl. No. 17/098,205, Response filed Sep. 6, 2023 to Final Office Action dated Jun. 6, 2023", 16 pgs.
"U.S. Appl. No. 17/098,205, Non Final Office Action dated Sep. 15, 2023", 9 pgs.
Lee, "Atomic Layer Deposition of TiO2 on negative electrode of lithium ion batteries in Journal of Power Sources", 244, (2013), 410-416.
Meng, "Emerging Application of Atomic Layer Deposition for Lithium-Ion Battery Studies in Advanced Materials", Advanced Materials vol. 24 Issue27, (Jun. 15, 2012), pp. 3589-3615.

\* cited by examiner

METHODS, SYSTEMS, AND COMPOSITIONS FOR THE LIQUID-PHASE DEPOSITION OF THIN FILMS ONTO THE SURFACE OF BATTERY ELECTRODES

CROSS-REFERENCE TO RELATED APPLICATIONS

This application is a continuation of U.S. patent application Ser. No. 17/232,945, filed Apr. 16, 2021, now issued as U.S. Pat. No. 11,139,460, which application is a continuation of U.S. patent application Ser. No. 16/244,024, filed Jan. 9, 2019, now issued as U.S. Pat. No. 10,985,360, which application is a continuation of International Application No. PCT/US2018/038612, filed Jun. 20, 2018, which claims the benefit of priority to U.S. Provisional Application No. 62/522,470, filed Jun. 20, 2017, the subject matter of all of which are hereby incorporated by reference as if fully set forth herein.

BACKGROUND

Traditional vapor phase atomic layer deposition (ALD) techniques rely on the evaporation of metalorganic precursors in an evacuated chamber. Substrates placed within this chamber are exposed to the impinging flux of metalorganic vapor. Substrate surfaces, which are often hydroxyl-terminated, react with impinging vapor to produce precisely one self-limiting, surface-saturating monolayer of adsorbed metalorganic. In one instance, metalorganic adsorption, followed by purge of excess metalorganic using vacuum and inert gas, followed by exposure of substrate surface to an oxidizer (such as $H_2O$, $O_2$ or $O_3$) results in the formation of precisely one monolayer of metal oxide.

ALD is particularly well-suited for generating conformal coatings with precise thicknesses on substrates possessing a porous microstructure. One example of such a substrate is a lithium-ion battery (LIB) electrode. State-of-the-art LIB electrodes are typically fabricated by coating slurries of anode or cathode particles mixed with binder and conductive additive onto foil current collectors. The open space remaining between particles after coating generates porosity throughout the thickness of electrode films. Substrates possessing this kind of morphology often cannot be adequately coated by other physical vapor deposition (PVD) processes (such as sputtering) because of "line-of-sight" limitations. Typically, deposition cycles in such techniques allow for little surface mobility of adsorbed atoms before reaction to complete product. As a result, only regions of substrate that are directly exposed to impinging flux of atoms are adequately coated. To conformally and uniformly coat all surfaces within a porous morphology, a deposition technique akin to ALD is required. Where substantial time is allowed for surface mobility of adsorbed atoms prior to reaction. ALD coatings on lithium-ion battery electrodes have been demonstrated to reduce deleterious side reactions typically associated with capacity fade such as solid-electrolyte-interphase (SEI) formation. However, numerous manufacturing limitations of traditional ALD processes present a need for a more manufacturable process that achieves similar film quality, uniformity and conformality.

While metalorganic reagents (i.e., precursors) used in ALD of oxides such as $Al_2O_3$ and ZnO (trimethylaluminum (TMA) and diethylzinc (DEZ), respectively) evaporate at relatively low temperatures (<100° C.) and at modest base vacuum pressures (>1 Torr), most metalorganic precursors require temperatures greater than 100° C. (and many greater than 200° C.) to yield a substantial vapor pressure. The key drawback to high precursor boiling point is that the substrate temperature must also be maintained above the precursor boiling point to prevent condensation of precursor on substrate surfaces. Precursor condensation results in loss of monolayer-by-monolayer growth control, which in turn results in unpredictable final film thickness. Substrates in an evacuated ALD chamber also often need to be heated radiatively (as with suspended roll-to-roll foil substrates), due to the lack of a heat transfer medium. Radiative heating is inefficient for reflective foil substrates such as those used in battery electrodes. High substrate temperatures (>200° C.) are also impractical for battery electrodes because polymer binders (such as PVDF) used in electrode coating degrade at such temperatures. Residual gases trapped within layers of roll-to-roll substrates also lengthen pump down time in traditional ALD chambers, and the loss of unused precursor through continuous purge and evacuation result in poor materials utilization in traditional ALD processes. The pyrophoric nature of the gaseous metalorganic precursors typically used in traditional ALD processes also requires the incorporation of costly safety infrastructure.

In U.S. PGPUB 2016/0351973, vapor phase ALD and derivative deposition technologies were disclosed to reduce SEI formation by directly coating battery electrode constituent powders with various encapsulating coatings prior to slurry formation. Such a technology avoids certain limitations of ALD coating of formed electrodes such as substrate temperature. However, a key shortcoming of this technology is that the passivating layers formed in this manner introduce substantial electrode internal resistance. Internal resistance can greatly limit battery power output due to voltage drop. In order for an encapsulating, passivating layer to function well as an inhibitor to deleterious side reactions, it must inhibit electron transfer between electrode and electrolyte. Wide band-gap insulating materials, as indicated in the '973 application, are good candidates for such an application. Unfortunately, when applied to individual electrode powder particles, they will also impede particle-to-particle electron transfer, which will result in internal resistance. The only way to circumvent the issue of internal resistance while maintaining the benefit of a passivating layer between electrode and electrolyte is to deposit the passivating layer on a pre-formed battery electrode.

High quality, conformal thin films of oxides and chalcogenides have been deposited for decades by techniques other than ALD, such as chemical bath deposition (CBD), successive-ionic layer adsorption and reaction (SILAR) and layer-by-layer sot-gel. In the CBD technique, (typically) aqueous solutions of complexed metal precursors are mixed with chalcogenide or oxide ion sources. Temperatures for these processes are usually modest, well below decomposition temperatures for battery electrode materials, binders or separators. CBD is best known for being used for depositing high quality CdS or ZnS as the n-type junction partner on CdTe or CIGS thin film solar cells. This technique has been used for years to set world record efficiencies for these types of solar cells. They have yielded high open-circuit voltages, high diode ideality and high shunt resistance, indicating excellent film quality and conformality. CBD processes have also been commercialized into high-volume thin film solar cell production lines.

A useful variation of the CBD technique is SILAR. In this instance, substrates are alternately exposed to cationic and anionic reactant solutions, with rinse steps in between. While this technique results in slower film growth, a benefit of the technique is the elimination of homogenous nucleation (precipitation) from intermixing of the two reactants, which dramatically improves materials utilization. Considering the fact that the tunneling limit of a good dielectric is on die order of 1-2 nm, SILAR techniques are feasible for deposition of passivation layers on battery electrode surfaces. Thickness control in SILAR processes is also better than in CBD processes; thickness control of a passivation layer on battery electrodes, for instance, is critical to prevent unwanted barriers to lithium diffusion while maintaining an electron tunneling barrier.

Solution-based techniques also exist that demonstrate layer by layer sol-gel coating using the same kinds of metal organics used in vapor phase ALD. For instance, an $Al_2O_3$ monolayer can be grown by immersion of a substrate in a solution of an appropriate aluminum alkoxide. The adsorption of the metalorganic precursor, followed by an oxidizing step such as hydrolysis, can yield one monolayer of oxide. These steps are repeated with rinse steps in between to yield monolayer-by-monolayer coatings. The metal alkoxide precursors are typically soluble to very high molarities in standard organic solvents like 2-propanol. In recent years, high quality $Al_2O_3$, $SiO_2$ and $ZrO_2$ recombination blocking layers were all grown on $TiO_2$ dye-sensitized solar cells using this technique.

U.S. PGPUB 2016/0090652 presents a liquid phase ALD method akin to that described above, wherein discrete wafer substrates are consecutively exposed to a solution of metalorganic precursor, a rinse solvent to remove excess metalorganic, an oxidizing solution and another rinse. These four steps are repeated to yield any desired thickness of film. The wafer is attached to a spin-coating apparatus, immediately after each step the wafer is spun to remove excess fluid. While this technique may work well for substrates similar to wafers, the process cannot be used to coat continuous substrates such as rolls of foil.

Therefore, a need exists for an alternative deposition method to ALD and other conventional methods that is faster, more efficient, safer, and more cost-effective for yielding conformal coatings on the surface of battery electrodes. To-date, solution deposition equipment that deposits conformally grown thin films on rolls of battery electrodes at commercial scale has not yet been demonstrated. Examples of key difficulties that have yet to be solved include homogeneous nucleation during film growth, cross-contamination of precursor solutions and uniformity of film thickness at all locations in the film.

SUMMARY

The present disclosure provides liquid-phase deposition methods, systems, and compositions for generating a thin-film coating. The thin films described herein are particularly useful for coating the surfaces of porous components used in electrochemical devices, such as battery electrodes or battery separator membranes. The methods and systems of the present disclosure promote precise control of thickness and conformality of desired films by allowing reagents to adsorb and move across substrate surfaces as in ALD, albeit through a liquid-phase delivery instead of vapor-phase. Liquid-phase delivery of reagents takes advantage of the energy of solvation to mobilize reagents instead of relying on high-temperature thermal evaporation.

In certain aspects, the present disclosure relates to a method for coating a thin film onto a surface of a battery electrode, comprising:

(a) providing a battery electrode onto a conveyance apparatus;

(b) transferring, by the conveyance apparatus, the battery electrode to a first reaction chamber comprising at least a first liquid solution comprising a first reagent.

(c) exposing, by the conveyance apparatus, the battery electrode to the first liquid solution to produce a partially coated battery electrode having a layer comprising an adsorbed first reagent on the surface of the battery electrode, (d) transferring, by the conveyance apparatus, the partially coated battery electrode to a second reaction chamber comprising a second liquid solution comprising at least a second reagent, and (e) exposing, by the conveyance apparatus, the partially coated battery electrode to the second liquid solution, wherein the at least second reagent reacts with die first adsorbed reagent of the partially coated battery electrode to produce a fully coated battery electrode comprising a monolayer of thin film coated onto the surface of the tilly coated battery electrode, the monolayer of thin film comprising a compound generated from the reaction of the second reagent and the absorbed first reagent.

In certain embodiments, the monolayer of thin film has a thickness from about 0.5 nm to 100 µm. In some embodiments, the monolayer of thin film may be composed of grains having a size 0.5 nm to 100 µm. In other embodiments, the monolayer of thin film may be crystalline or amorphous.

In certain embodiments, the battery electrode has a thickness of 100 nm to 1,000 µm. In other embodiments, the battery electrode to be coated has pores ranging in size of 0.1 nm to 100 µm. In some embodiments, the battery electrode to be coated has a film porosity of 1-90%. In some embodiments, the battery electrode is composed of graphite, Si, Sn, a Si-graphite composite, a Sn-graphite or lithium metal. In other embodiments, the battery electrode is composed of $LiNi_xMn_yCo_zO_2$, $LiNi_xCo_yAl_zO_2$, $LiMn_xNi_yO_2$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

In certain embodiments, the conveyance apparatus may be a roll-to-roll deposition system. In some embodiments, the conveyance apparatus comprises a series of rollers for guiding the battery electrode and partially coated battery electrode to the first and second reaction chambers, respectively.

In certain embodiments, the battery electrode is exposed, either partially or fully, to the first liquid solution by a process selected from the group consisting of submerging, spraying, slot die coating, and gravure roller coating. In other embodiments, the partially coated battery electrode is exposed, either partially or fully, to the second liquid solution by a process selected from the group consisting of submerging, spraying, slot die coating, and gravure roller coating. In some embodiment, the first and second liquid solutions are non-ionic.

In certain embodiments, the method further comprises rinsing the partially coated battery electrode with a first rinsing solution comprising a first solvent to produce a saturated first layer on the partially coated battery electrode and a first residual solution comprising the first solvent and unreacted first reagent. In some embodiments, the method further comprises passing the first residual solution to a first filtration step to separate unreacted first reagent from the first solvent.

In certain embodiments, the method further comprises rinsing the fully coated battery electrode with a second rinsing solution comprising a second solvent to produce a saturated monolayer of thin film on the fully coated battery electrode and a second residual solution comprising the second solvent and unreacted second reagent. In some embodiments, the method further comprises passing the second residual rinsing solution to a second filtration step to separate the unreacted second reagent from the second solvent. In other embodiments, the method further comprises recycling recovered unreacted first or second reagent back to the first or second liquid solutions, respectively, and recycling recovered first or second solvent back to the first or second rinsing solutions, respectively.

In certain embodiments, the filtration steps are carried out using membrane separation, chemical precipitation, ion-exchange, electrochemical removal, physical adsorption, flow filtration chromatography, or a combination of these.

In certain embodiments, the first liquid solution comprises more than one reagent. In some embodiments, the second liquid solution comprises more than one reagent. In some embodiments, the first and second reagents are metalorganic precursors. In other embodiments, the first and second reagents are cationic or anionic.

In certain embodiments, the first and second liquid solutions further comprise an organic solvent, water, or a mixture of both.

In certain embodiments, the thin film comprises a compound selected from one of the following groups.
- (a) binary oxides of type $A_xO_y$, where A is an alkali metal, alkali-earth metal, transition metal, semimetal or metalloid and x and y are stoichiometric coefficients;
- (b) ternary oxides of type $A_xB_yO_z$, where A and B are any combination of alkali metal, alkali-earth metal, transition metal, semimetal or metalloid and x, y and z are stoichiometric coefficients;
- (c) quaternary oxides of type $A_wB_xC_yO_z$, where A, B and C are any combination of alkali metal, alkali-earth metal, transition metal, semimetal or metalloid and w, x, y and z are stoichiometric coefficients;
- (d) binary halides of type $A_xB_y$, where A is an alkali metal, alkali-earth metal, transition metal, semimetal or metalloid, B is a halogen and x and y are stoichiometric coefficients;
- (e) ternary halides of type $A_xB_yC_z$, where A and B are any combination of alkali metal, alkali-earth metal, transition metal, semimetal or metalloid, C is a halogen and x, y and z are stoichiometric coefficients;
- (f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
- (g) binary nitrides of type $A_xN_y$, where A is an alkali metal, alkali-earth metal, transition metal, semimetal or metalloid and x and y are stoichiomenic coefficients;
- (h) ternary nitrides of type $A_xB_yN_z$, where A and B are any combination of alkali metal, alkali-earth metal, transition metal, semimetal or metalloid and x, y and z are stoichiometric coefficients;
- (i) quaternary nitrides of type $A_wB_xC_yN_z$, where A, B and C are any combination of alkali metal, alkali-earth metal, transition metal, semimetal or metalloid and w, x, y and z are stoichiometric coefficients;
- (j) binary chalcogenides of type $A_xB_y$, where A is an alkali metal, alkali-earth metal, transition metal, semimetal or metalloid, B is a chalcogen and x and y are stoichiometric coefficients;
- (k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;
- (l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;
- (m) binary carbides of type $A_xC_y$, where A is an alkali metal, alkali-earth metal, transition metal, semimetal or metalloid and x and y are stoichiometric coefficients;
- (n) binary oxyhalides of type $A_xB_yO_z$, where A is an alkali metal, alkali-earth metal, transition metal, semimetal or metalloid, B is a halogen and x, y and z are stoichiometric coefficients;
- (o) binary arsenides of type $A_xAs_y$, where A is an alkali metal, alkali-earth metal, transition metal, semimetal or metalloid and x and y are stoichiometric coefficients;
- (p) ternary arsenides of type $A_xB_yAs_z$, where A and B are any combination of alkali metal, alkali-earth metal, transition metal, semimetal or metalloid and x, y and z are stoichiometric coefficients;
- (q) quaternary arsenides of type $A_wB_xC_yAs_z$, where A, B and C are any combination of alkali metal, alkali-earth metal, transition metal, semimetal or metalloid and w, x, y and z are stoichiometric coefficients;
- (r) binary phosphates of type $A_xB_y(PO_4)_z$, where A is an alkali metal, alkali-earth metal, transition metal, semimetal or metalloid and x and y are stoichiometric coefficients;
- (s) ternary phosphates of type $A_zB_y(PO_4)_z$, where A and B are any combination of alkali metal, alkali-earth metal, transition metal, semimetal or metalloid and x, y and z are stoichiometric coefficients; and
- (t) quaternary phosphates of type $A_wB_xC_y(PO_4)_z$, where A, B and C are any combination of alkali metal, alkali-earth metal, transition metal, semimetal or metalloid and w, x, y and z am stoichiometric coefficients.

In certain embodiments, the compound generated is $Al_2O_3$, CdS, or TiN.

In certain embodiments, the battery electrode comprises a substrate. In some embodiments, the substrate is in the form of a foil, sheet, or film. In other embodiments, the substrate is in the form of a wafer or piece of glass. In some embodiments, the substrate is made up of an organic material selected from the group consisting of polyimide, polyethylene, polyether ether ketone (PEEK), polyester, or polyethylene napthalate (PEN). In further embodiments, the substrate is made up of a metal, such as copper, aluminum, or stainless steel.

In certain aspects, the present disclosure relates to a liquid phase deposition method for coating a thin film onto a surface of a battery electrode, comprising:
- (a) providing a battery electrode into a reaction chamber;
- (b) exposing the battery electrode to a first liquid solution comprising a first reagent to produce a partially coated battery electrode having a layer comprising an adsorbed first reagent on the surface of the battery electrode; and
- (c) exposing the partially coated battery electrode to a second liquid solution comprising a second reagent, wherein the at least second reagent reacts with the first adsorbed reagent of the partially coated battery electrode to produce a fully coated battery electrode comprising a monolayer of thin film coated onto the surface of the fully coated battery electrode, the monolayer of thin film comprising a compound generated from the reaction of the second reagent and the absorbed first reagent.

In certain embodiments, the method further comprises rinsing the partially coated battery electrode with a first rinsing solution comprising a first solvent to produce a saturated first layer on the partially coated battery electrode and a first residual solution comprising the first solvent and unreacted first reagent; and rinsing the fully coated battery electrode with a second rinsing solution comprising a second solvent to produce a saturated monolayer of thin film on the fully coated battery electrode and a second residual solution comprising the second solvent and unreacted second reagent.

In certain embodiments, the method further comprises passing the first residual solution to a first filtration step to separate unreacted first reagent from the first solvent, and passing the second residual rinsing solution to a second filtration step to separate the unreacted second reagent from the second solvent.

In certain embodiments, the method further comprises recycling recovered unreacted first or second reagent back to the first or second liquid solutions, respectively; and recycling recovered first or second solvent back to the first or second rinsing solutions, respectively.

In certain aspects, the present disclosure relates to a system for coating a thin film onto a battery electrode, comprising:
 a conveyance apparatus for conveying the battery electrode to:
  (a) a first reaction chamber where the battery electrode is exposed to a first liquid solution comprising at least a first reagent to produce a layer comprising an adsorbed first reagent on the battery electrode; and
  (b) a second reaction chamber where the battery electrode having a layer comprising an adsorbed first reagent is exposed to a second liquid solution comprising at least a second reagent, wherein the at least second reagent reacts with the first adsorbed reagent to produce the thin film on the surface of the electrode.

In certain embodiments, the conveyance apparatus comprises a series of rollers for guiding the electrode to the first and second reaction chambers. In some embodiments, the first and second reaction chambers are in the form of a tank, tray, or bath. In some embodiments, the first and second reaction chambers include a sensor for determining the amount of first or second liquid solution that is in the respective reaction chamber. In some embodiments, the first and second reaction chambers comprise a valve for regulating the amount of first or second liquid solution in their respective reaction chambers, said valve controlled by the sensor in each reaction chamber.

In certain embodiments, the system further comprises a first rinsing chamber located between the first and second reaction chambers, the first rinsing chamber containing a first rinsing solution comprising a first solvent for rinsing the battery electrode conveyed to the first rinsing chamber by the conveyance apparatus to thereby produce a saturated first layer on the battery electrode and a first residual solution comprising the first solvent and unreacted first reagent. In some embodiments, the system further comprises a first filtration apparatus for separating the unreacted first reagent from the first solvent in the first rinsing solution.

In certain embodiments, the system further comprises a second rinsing chamber located after the second reaction chamber, the second rinsing chamber containing a second rinsing solution comprising a second solvent for rinsing the battery electrode conveyed to the second rinsing chamber by the conveyance apparatus to produce the thin film coated on the surface of the battery electrode. In some embodiments, the system further comprises a second filtration apparatus for separating the unreacted second reagent from the second solvent in the second rinsing solution.

In certain embodiments, the first filtration apparatus and the second filtration apparatus are selected from one of the following: a separation membrane, a filtration column, or a chromatographic column, a chemical or electrochemical separation tank, an adsorption column, or a combination of these.

In certain embodiments, the compound generated by the reaction of the absorbed first reagent and the second reagent is selected from one of the following.
 (a) binary oxides of type $A_xO_y$, where A is an alkali metal, alkali-earth metal, transition metal, semimetal or metalloid and x and y are stoichiometric coefficients;
 (b) ternary oxides of type $A_xB_yO_z$, where A and B are any combination of alkali metal, alkali-earth metal, transition metal, semimetal or metalloid and x, y and z are stoichiometric coefficients;
 (c) quaternary oxides of type $A_wB_xC_yO_z$, where A, B and C are any combination of alkali metal, alkali-earth metal, transition metal, semimetal or metalloid and w, x, y and z are stoichiometric coefficients;
 (d) binary halides of type $A_xB_y$, where A is an alkali metal, alkali-earth metal, transition metal, semimetal or metalloid, B is a halogen and x and y are stoichiometric coefficients;
 (e) ternary halides of type $A_xB_yC_z$, where A and B are any combination of alkali metal, alkali-earth metal, transition metal, semimetal or metalloid, C is a halogen and x, y and z are stoichiometric coefficients;
 (f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
 (g) binary nitrides of type $A_xN_y$, where A is an alkali metal, alkali-earth metal, transition metal, semimetal or metalloid and x and y are stoichiometric coefficients;
 (h) ternary nitrides of type $A_xB_yN_z$, where A and B are any combination of alkali metal, alkali-earth metal, transition metal, semimetal or metalloid and x, y and z are stoichiometric coefficients;
 (i) quaternary nitrides of type $A_wB_xC_yN_z$, where A, B and C are any combination of alkali metal, alkali-earth metal, transition metal, semimetal or metalloid and w, x, y and z are stoichiometric coefficients;
 (j) binary chalcogenides of type $A_xB_y$, where A is an alkali metal, alkali-earth metal, transition metal, semimetal or metalloid, B is a chalcogen and x and y are stoichiometric coefficients;
 (k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;
 (l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;
 (m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y is a stoichiometric coefficient;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A. B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C am any combination of alkali metal, alkali-earth metal, transition metal, semimetal or metalloid and w, x, y and z are stoichiometric coefficients.

In certain embodiments, the system further comprises a motor. The motor is mechanically linked to different components of the system, for example, rollers, to provide a means for conveying or driving the electrode through the system. In some embodiments, the system comprises a computer. The computer may be operably connected or otherwise in communication with the motor and/or other devices of the system as a means for controlling the operation and function of the conveyance apparatus and/or other system components.

In certain aspects, the present disclosure relates to a battery electrode, comprising a porous microstructure coated with a monolayer of thin film, wherein the thin film has a thickness from 0.5 nm to 100 μm. In some embodiments, the battery electrode has a thickness of 100 nm to 1,000 μm. In some embodiments, the battery electrode comprises pores ranging in a size of 0.1 nm to 100 μm. In some embodiments, the battery electrode has a film porosity of 1-99%. In some embodiments, the porous microstructure is composed of graphite, Si, Sn, a Si-graphite composite, a Sn-graphite composite, or lithium metal. In other embodiments, the porous microstructure is composed of $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$ sulfur or $LiCoO_2$ where x, y and z are stoichiometric coefficients.

In certain embodiments, the thin film comprises a compound produced by a reaction of a first reagent and a second reagent, wherein the reaction occurs on a surface of an electrode that is fully or partially submerged in a solution comprising said first and second reagents, whereby said reaction precipitates the compound onto the surface of the electrode. In some embodiments, the compound comprises a metal oxide. In other embodiments, the compound comprises a transition metal dichalcogenide.

In certain embodiments, the battery electrode further comprises a substrate. In some embodiments, the substrate is in the form of a foil, sheet, or film. In some embodiments, the substrate of the battery electrode is made up of an organic material selected from the group consisting of polyimide, polyethylene, polyether ether ketone (PEEK), polyester, or polyethylene napthalate (PEN). In other embodiments, the substrate is made up of a metal, such as copper, aluminum, or stainless steel.

In certain embodiments, the method comprises producing a plurality of unique thin films. In some embodiments, each thin film of the plurality comprises different compounds. In further embodiments, the thin films may be grown on top of one another as a stack on the surface of the battery electrode.

In certain aspects, the present disclosure relates to a method for coating a thin film onto a surface of a battery electrode, comprising:

(a) providing a battery electrode onto a conveyance apparatus.

(b) transferring, by the conveyance apparatus, the battery electrode to a reaction chamber comprising a liquid solution comprising at least two different reagents, and (c) exposing, by the conveyance apparatus, the battery electrode to the liquid solution, wherein the at least two different reagents react to produce a fully coated battery electrode comprising a monolayer of thin film on the surface of the fully coated battery electrode, the monolayer of thin film comprising a compound generated from the reaction of the at least two different reagents.

DETAILED DESCRIPTION

The present disclosure provides liquid-phase deposition methods and systems for forming coatings of thin films of various types and morphologies and in various configurations. To date, techniques for forming conformal coatings of thin films (<10 micrometer (μm) thickness) on substrates with a microstructure comprising a high degree of porosity, tortuosity and/or large number of high aspect ratio features (i.e., "non-planar" microstructure) are either ineffective ("line of sight" limitation of physical vapor deposition) or are costly and time-consuming (traditional Atomic Layer Deposition (ALD)). Embodiments of the present disclosure achieve a cost-effective means for forming uniform, conformal layers on non-planar microstructures. Specifically, the present disclosure focuses on forming uniform, conformal layers on the surface of non-planar battery electrodes.

The method refers generally to a liquid phase coating process for the deposition of thin films. These films may be used to coat the surfaces of components of electrochemical devices such as batteries. In particular, for batteries, such as lithium ion batteries, applications that may benefit with the coatings described herein may include high-voltage cathodes, fast charging, silicon-containing anodes, cheaper electrolytes, and nanostructured electrodes. Thus, in some embodiments, the thin films may be coated onto an electrode of a battery, such as a cathode or anode.

An electrode comprises a porous coating on top of a substrate, such as a foil or a sheet. In some embodiments, the battery electrode comprises graphite, Si, Sn, a silicon-graphite composite, a Sn-graphite composite, or lithium metal. In some cases, the battery electrode comprises $Li_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

In certain embodiments, the substrate may be a continuous substrate, typically in the form of a foil or sheet. A "continuous substrate" as used herein refers to a substrate that possesses an aspect ratio of at least 10:1 between its two largest dimensions, and is sufficiently flexible so as to be wound onto itself in the form of a roll. It may be made up of various materials, including but not limited to metal, such as copper, aluminum, or stainless steel, or an organic material, such as polyimide, polyethylene, polyether ether ketone (PEEK), or polyester, polyethylene napthalate (PEN).

Figure 7:
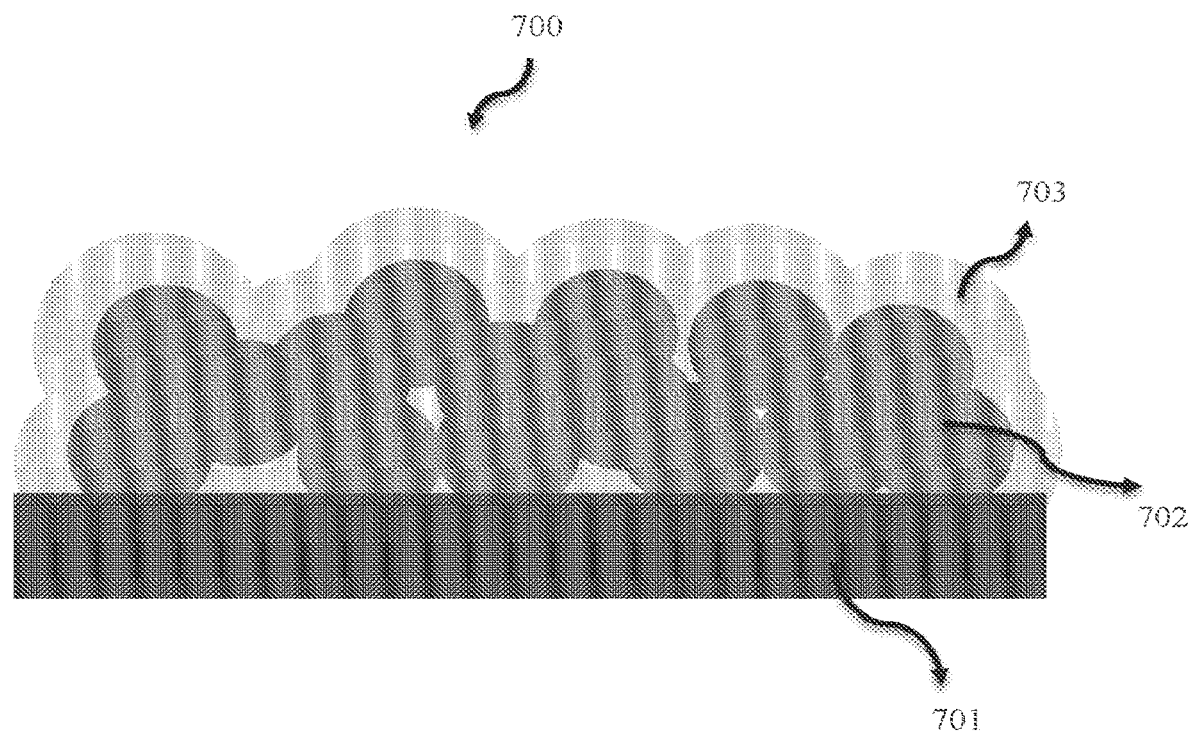
FIG. 7 is an illustration of a battery electrode coated with a thin film in accordance with the present disclosure on top of a foil substrate.

An example of an embodiment of a coated battery electrode in accordance with the present disclosure is shown in FIG. 7. A coated battery electrode, 700, comprises electrode constituent particles, 701, that are coated with a thin film, 702 The thin film, 702, may be between 0.5 nm to 100 μm thick. The electrode constituent particles, 701, are situated on top of a foil substrate, 703.

In certain aspects, the methods and systems provided herein relate to generating an artificial SEI layer in batteries that may be more resistant to dissolution than current SEIs, may have sufficient adhesion to the material or component to be coated with adequate mechanical stability, may be reasonably electrically resistive to prevent electrolyte breakdown while being conductive of ions (as in the case of batteries, for example lithium ions), and may be substantially devoid ofany particle-to-particle internal resistance.

Figure 1:
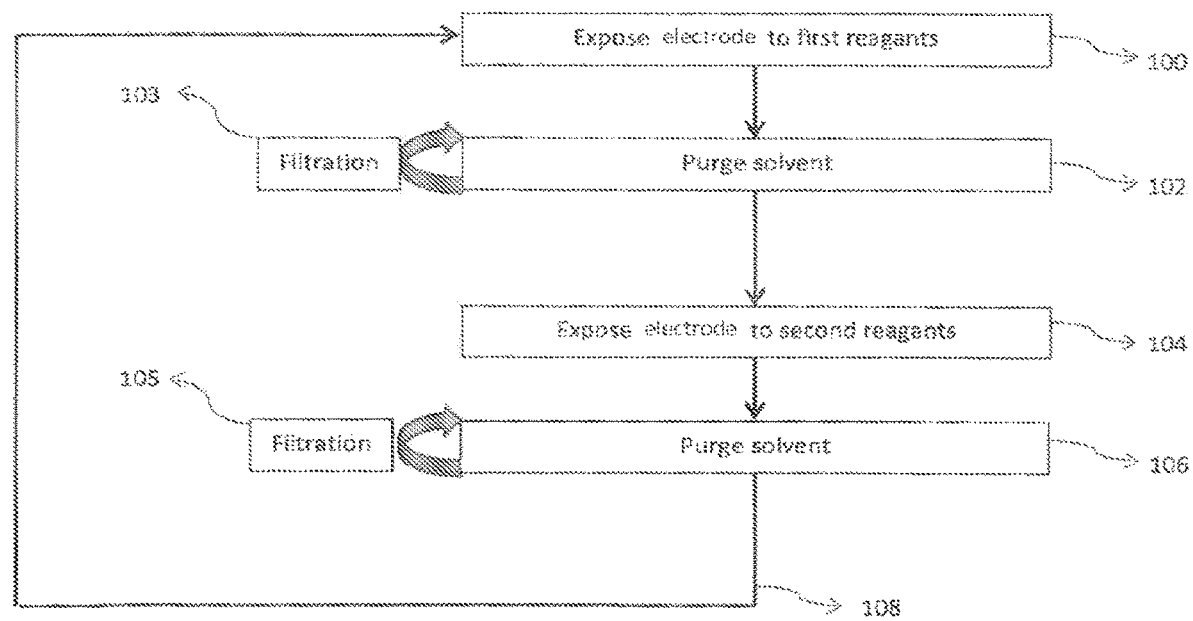
FIG. 1 is a general flow scheme for an embodiment of the method in accordance with the disclosure. The method includes rinsing/purge steps as well as filtration steps.

A simple flow scheme for an embodiment of the method in accordance with the disclosure is shown in FIG. 1. While the embodiment of FIG. 1 is related to a method for coating a thin film onto the surface of a battery electrode, this description is only representative of a component to be deposited using the methods and systems provided herein and is not to be construed as being limited in any way.

Referring to FIG. 1, a battery electrode, for example, may be exposed, in 100, to a first liquid solution comprising a first reagent(s) in a first reaction chamber to produce a layer comprising an adsorbed first reagent(s) on the surface of the electrode.

The first liquid solution comprises at least a first reagent. The first reagent may be any compound that is able to react with the material of the electrode (i.e., the component to be coated) to form a self-limiting layer. In certain embodiments, the first reagent is a metalorganic compound. Examples of such metalorganics include, but are not limited to, aluminum tri-sec butoxide, titanium ethoxide, niobium ethoxide, trimethyl aluminum, and zirconium tert-butoxide. In another embodiment, the first reagent comprises an aqueous solution comprising an ionic compound. Examples include, but are not limited to, zinc acetate, cadmium chlorid, zinc chloride, zirconium chloride, and zinc sulfate. In some embodiments, the first solution may vary in pH. In some embodiments, the first liquid solution may be a solution including ionic compounds of both cationic and anionic precursors that react to form a solid film, in this case the film growth is limited by the kinetics of the film-forming reaction. In some embodiments, the first liquid solution may be a solution including both metalorganic and oxidizing precursors that react to form a solid film; in this case the film growth is limited by the kinetics of the film-forming reaction.

In the embodiments where the first reagent is a metalorganic, the first liquid solution may also comprise a solvent that is used to dissolve or complex the first reagent. Preferred solvents include organic solvents, such as an alcohol, for example, isopropyl alcohol or ethanol, alcohol derivatives such as 2-methoxyethanol, slightly less polar organic solvents such as pyridine or tetrahydrofuran (THF), or nonpolar organic solvents such as hexane and toluene.

In one embodiment, the first liquid solution is contained within a first reaction chamber. The reaction chamber must be a device large enough to accommodate receiving the electrode and to contain the amount of liquid solution to be used in the self-limiting layer producing reaction. Such devices that may be used as die reaction chamber include, but are not limited to, tanks, baths, trays, beakers, or the like.

The electrode may be transferred to the first reaction chamber by a conveying apparatus. The conveying apparatus, as described in more detail below, may be adapted and positioned in such a way as to guide or direct the electrode into and out of the first chamber.

In certain embodiments, the electrode may be submerged, either fully or partially, into the first and second liquid solutions of the first and second reaction chambers, respectively. In other embodiments, the electrode may be sprayed with the first and second liquid solutions in first and second reaction chambers, respectively.

In another embodiment, the electrode may be conveyed underneath a slot die coater, from which the first liquid solution is continuously dispensed to generate a two-dimensional liquid film. The speed at which the electrode is conveyed and the flow rate of fluid through the die determines the thickness of the liquid film. The solvent may then simply evaporate to create a solid film of the dissolved components, or the liquid film may possess reactants that react to precipitate a thin film on the surface of the electrode. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire slot die coating process may then be repeated to generate new films of different chemical composition or to simply generate thicker coatings of the same chemical composition. In this case, the reaction chambers simply comprise the area where the slot-die coater is located, and do not necessarily resemble an enclosed space as is suggested by the term "chamber."

In another embodiment, the electrode may be conveyed through a tank containing a coating solution and a gravure roller. In this embodiment, the gravure roller continuously transfers fluid from the dip tank to the adjacent web due to preferential surface tension (wetting) of the web and the roller by the coating solution. As in slot-die coating, the result is initially a two-dimensional liquid film on the surface of the electrode. Particular solution, web and roller compositions, for example, can influence the surface tension of the fluid on both the web and the roller, thereby influencing the coating efficiency of the process. The solvent may then simply evaporate to create a solid film of the dissolved components, or the liquid film may possess reactants that react to precipitate a thin film on the surface of the electrode. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire gravure coating process may then be repeated to generate new films of different chemical composition or to simply generate thicker coatings of the same chemical composition.

Multiple sequential, repeated steps of the same process (i.e., slot-die or gravure coating) can be performed with the same or different solutions. Solutions may be separated (as in first solution, second solution, etc.) to avoid cross-contamination, for instance, or to prevent homogenous nucleation when a heterogeneous film-forming reaction is preferred.

The electrode is exposed to the first liquid solution for a sufficient time (a "residence time") so as to allow the first reagent(s) to adsorb onto the electrode surface and generate a continuous layer (i.e. self-limiting layer). Examples of process variables that may influence this step include solution and electrode temperature, residence time and reagent concentration.

An advantage of the present methods and systems is that the solvents used vary in specific heat capacity and can also be employed as both heat transfer and precursor transfer media—yielding faster, more efficient heating of electrodes. Precursors dissolved into solution are also much more stable with regards to air ambient exposure as compared to their pure analogs, yielding improved safety and easier handling.

Optionally, the electrode may undergo a first rinsing/purge step, 102, whereby excess first reagent from step 100 is removed with a solvent. Here, most or all of the non-adsorbed first reagent will be removed from the electrode surface before moving the electrode to the next process step. Key process variables include solvent temperature, electrode temperature, and residence time. 102 is shown in FIG. 1 as a single step, however, in certain embodiments, this step may be repeated or may have additional rinsing/purging steps to improve first reagent removal.

The rinsing step leaves exactly one saturated (i.e., purified) first layer on the electrode and a residual solution comprising the first solvent, unreacted first reagent(s) and other reaction byproducts in the reaction chamber.

As an additional optional step, to recover the solvent used in the rinsing step and any unreacted reagent, the residual solution may be passed to a filtration step, 103. The filtration step separates the solvent from the unreacted reagent (and any reaction byproduct). The filtration step also prevents cross-contamination between chambers and avoids slow contamination of rinse solutions with reagent over the course of operation. Continuous filtering of rinse baths can not only maintain purity of rinse solvent but can also act as a system for materials recovery, thereby boosting the materials utilization efficiency of the process. Any filtration techniques known in the art may be used. Preferred technologies include, but are not limited to, membrane separation, chemical precipitation, ion-exchange, electrochemical removal, physical adsorption, and flow filtration chromatography.

The separated solvent may be recycled back to the rinsing step, 102, for reuse. Likewise, the filtered unreacted first reagent(s) may also be recycled back to 100 for further use in the process (not shown).

A partially coated battery electrode, having a layer (i.e., a self-limiting layer) comprising an adsorbed first reagent may then be exposed, in 104, to a second liquid solution comprising a second reagent in a second reaction chamber.

In some embodiments, the second liquid solution may comprise an oxidizing agent, such as an oxide or chalcogenide source, examples of which include, but are not limited to, water, thioacetamide, and sodium sulfide. A solvent may also be present, which may comprise of polar or nonpolar organic solvents or may just be water. In other embodiments, the second liquid solution may also contain a nitrogen-containing reagent such as ammonia or hydrazine. In some embodiments, the second solution may also vary in pH.

The second reagent is of a different and distinct composition as compared to the first reagent. The second reagent is selected to be able to react with the adsorbed first reagent to produce a complete monolayer of thin film compound coated onto the electrode.

In some embodiments, the entire film may be formed by reagents exposed to the electrode from the first liquid solution alone. In this case, the second solution may be skipped entirely.

In some embodiments, the compound formed may comprise a metal oxide, such as $Al_2O$, and $TiO_2$.

In other embodiments, the compound formed may comprise Transition Metal Dichalcogenides (TMDs). Typical examples of this class of materials follow the general chemical formula $MX_2$, where M is a transition metal such as Mo, W, Ti, etc., and X is either S or Se.

In some embodiments, the compound is composed of any combination of the following polymers: polyethylene oxide (PEO), poly vinyl alcohol (PVA), poly methyl methacrylate (PMMA), poly dimethyl siloxane (PDMS), poly vinyl pyrollidone (PVP). Such polymers, when combined with lithium salts such as $LiClO_4$, $LiPF_6$ or $LiNO_3$, among others, can yield a solid polymer electrolyte thin film.

In some embodiments, the compound may comprise, for example, a sulfide or selenide of Mo, Ti, or W. These materials vary widely in their electronic properties, such as bandgap, and thus can be used to create tailored semiconductor heterojunctions that will, for example, block electron transfer necessary for degrading reactions in lithium-ion battery operation. Specifically, such mechanisms can be exploited to block degrading reactions on both anode and cathode surfaces.

In some embodiments, the compound formed may be selected from the group consisting of:
 (a) binary oxides of type $A_xO_y$, where A is an alkali metal, alkali-earth metal, transition metal, semimetal or metalloid and x and y are stoichiometric coefficients;
 (b) ternary oxides of type $A_xB_yO_z$, where A and B are any combination of alkali metal, alkali-earth metal, transition metal, semimetal or metalloid and x, y and z are stoichiometric coefficients;
 (c) quaternary oxides of type $A_wB_xC_yO_z$, where A, B and C are any combination of alkali metal, alkali-earth metal, transition metal, semimetal or metalloid and w, x, y and z are stoichiometric coefficients;
 (d) binary halides of type $A_xB_y$, where A is an alkali metal, alkali-earth metal, transition metal, semimetal or metalloid, B is a halogen and x and y are stoichiometric coefficients;

(e) ternary halides of type $A_xB_yC_z$, where A and B are any combination of alkali metal, alkali-earth metal, transition metal, semimetal or metalloid, C is a halogen and x, y and z are stoichiometric coefficients;

(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;

(g) binary nitrides of type $A_xN_y$, where A is an alkali metal, alkali-earth metal, transition metal, semimetal or metalloid and x and y are stoichiometric coefficients;

(h) ternary nitrides of type $A_xB_yN_z$, where A and B are any combination of alkali metal, alkali-earth metal, transition metal, semimetal or metalloid and x, y and z are stoichiometric coefficients;

(i) quaternary nitrides of type $A_wB_xC_yN_z$, where A, B and C are any combination of alkali metal, alkali-earth metal, transition metal, semimetal or metalloid and w, x, y and z are stoichiometric coefficients;

(j) binary chalcogenides of type $A_xB_y$, where A is an alkali metal, alkali-earth metal, transition metal, semimetal or metalloid, B is a chalcogen and x and y are stoichiometric coefficients;

(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;

(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;

(m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y are stoichiometric coefficients;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A, B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In the case that the reaction is between a non-ionic precursor such as a metalorganic with an oxidizer, as in the hydrolysis of trimethylaluminum, organic moieties are removed and replaced with metal-oxygen-metal bonds, until all bonds are fully saturated. In the case that the reaction is between two ionic solutions, as in the reaction between solutions of $Cd^{2+}$ and $S^{2-}$ ions, the high solubility product constant of the reaction promotes precipitation of an ionic compound, in this case CdS, with the electrode promoting heterogeneous film formation by minimizing surface energy.

Similar to 102, the electrode from 104 is then directed to a second rinsing/purge step, 106, to remove non-adsorbed/unreacted second reagent.

In certain embodiments, the thin film may have a thickness of about 0.5 nm to 100 μm. For example, the thin film may be a thickness within the range of 0.5 nm-10 nm, 10 nm-50 nm, 50 nm-100 nm, 100 nm-500 nm, 500 nm-1 μm, 1 μm-10 μm, 10 μm-50 μm, or 50 μm-100 μm.

In some embodiments, 100 to 106 may be repeated any number of times until a desired thickness of thin film coating is formed onto the electrode. This scheme is indicated by 108, where the electrode coated with the thin film is directed back to step 100 for further processing (forming a loop). In some embodiments, the steps will be repeated but with different precursors, thereby yielding coatings comprising of stacks of thin films comprising various compounds.

Additionally, during 102 and 106, the rinse or purge solvent may be either continuously or periodically filtered so that unreacted reagent(s) can be separated and recovered from solvent. This filtering step is indicated in steps 103 and 105, respectively. Both precursor and solvent can then be potentially recycled back into the process. Here, the recycling of the solvent is shown by the return arrows. These filtration steps will save significant material costs over the lifetime of the apparatus. For every wash and rinse step, a filtration step may be incorporated into the design. The filtration technique is preferably tuned to the types of reagents used in steps 100 and 104. For instance, an aqueous ionic solution may require the types of filtration columns used in deionizers to be adequately filtered. However, an organometallic may be better removed by a tangential flow filtration system that excludes by molecular weight, for instance.

Figure 2:
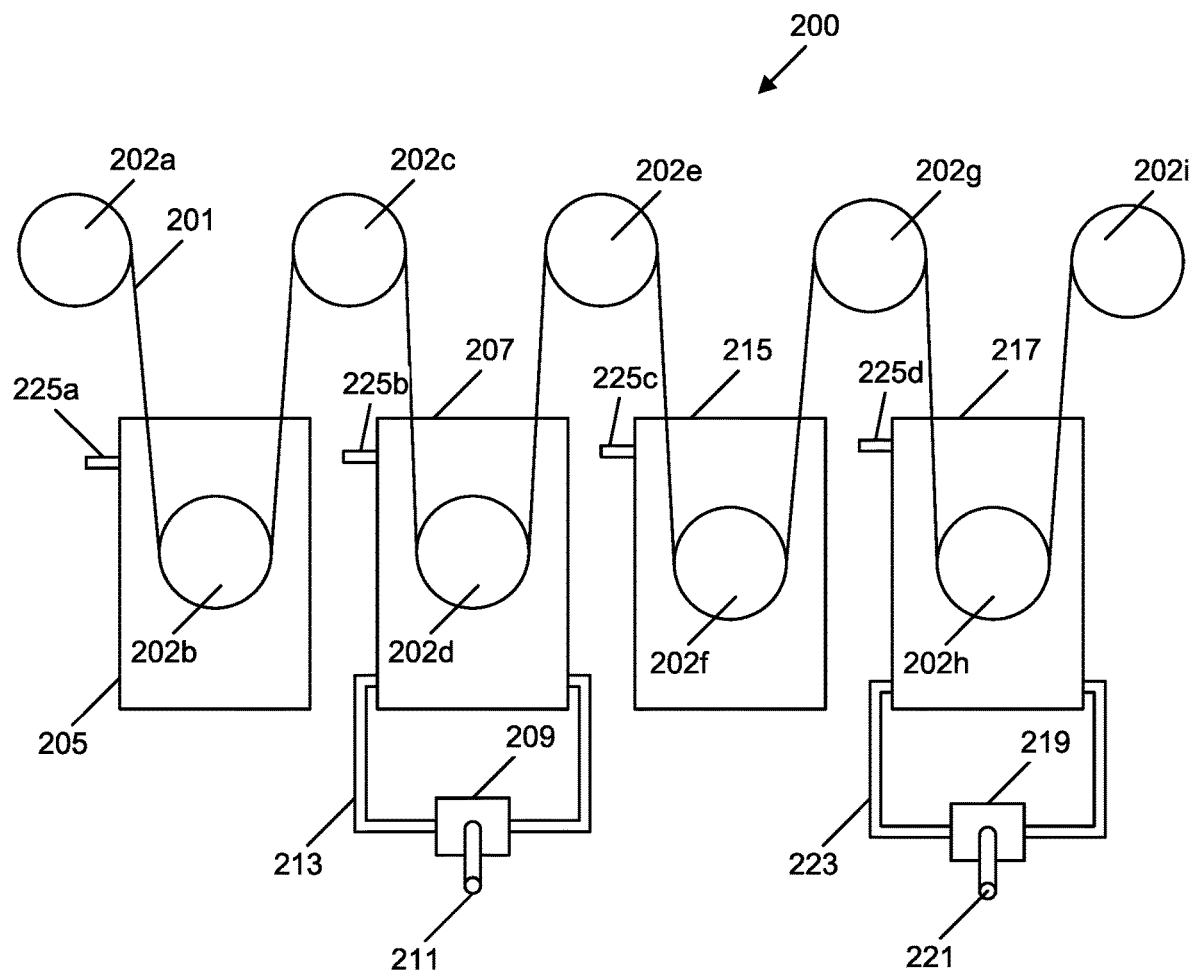
FIG. 2 is a schematic drawing of one embodiment of a system for coating a thin film onto the surface of a battery electrode in accordance with the disclosure.

A schematic drawing of an embodiment of a system for coating a thin film onto the surface of an electrode is shown in FIG. 2. In FIG. 2, the reaction chambers are shown as sequential tanks or baths containing reaction solutions; the electrode is conveyed into the reaction chambers with the assistance of a conveying apparatus. While the embodiment of FIG. 2 is related to a method for coating a thin film onto the surface of a battery electrode, this description is only representative of a component to be coated using the methods and systems provided herein and is not to be construed as being limited in any way.

The conveying apparatus of FIG. 2 is particularly suited and adapted in such a way as to guide or direct the battery electrode into and out of the first and second reaction chambers in a sequential manner.

The conveyance apparatus, which is preferably automated, comprises a series of rollers, such as tensioning rollers, positioned in such a manner as to guide or direct the electrode into and out of the first and second reaction chambers. In this way, the system can provide for a continuous liquid deposition process for coating a thin film onto the surface of an electrode. The series of rollers, 202a-i, are driven by a conveying motor (not shown). The rollers, 202a-i, are operated and oriented in such a way to enable an electrode, 201, to be conveyed through the system as discussed in greater detail below. The system, 200, also comprises a series of chambers, 205, 207, 215, and 217.

In certain embodiments, the first and second reaction chambers may include a sensor for determining or measuring the volume of first or second liquid solution that is in the respective reaction chamber or the concentration of precursor in each respective reaction chamber. Additionally, the first and second reaction chambers may also comprise a regulating valve that is electronically actuated by the sensor. When the sensor (such as a float switch) determines that the liquid solution is too low, the valve opens up, allowing more liquid solution from another source to flow into the reaction chamber. In some cases, a pump (such as a peristaltic pump) is used to drive the liquid solution into the reaction chamber. When the sensor determines that the liquid solution is at the desired level, the valve closes, preventing excess liquid solution from flowing into the reaction chamber. In some cases, if the sensor determines that the liquid solution is too high in the reaction chamber, the valve opens up, allowing the excess liquid to flow out of the reaction chamber. In the case that the sensor detects precursor concentration, a valve may expose the tank to a stock solution of high precursor concentration in the circumstance that the tank precursor solution is detected to be low, and vice-versa. An example of such a sensor is an ion-selective electrode.

In further embodiments, the system comprises a first rinsing chamber located between the first and second reaction chambers. The first rinsing chamber contains the first rinsing solution comprising the first solvent for rinsing the electrode conveyed to the first rinsing chamber by the conveyance apparatus to produce a saturated first layer on the electrode and a first residual solution comprising the first solvent and unreacted first reagent.

Likewise, the system may also comprise a second rinsing chamber located after the second reaction chamber. The second rinsing chamber contains a second rinsing solution comprising a second solvent for rinsing the electrode conveyed to the second rinsing chamber by the conveyance apparatus to produce a thin film coated onto the electrode.

Chamber 205 is a first reaction chamber that contains a first liquid solution comprising a first reagent and a solvent.

Chamber 207 is a first rinsing chamber located after the first reaction chamber, 205, contains a first rinsing solution comprising a first solvent. A first filtration apparatus, 209, is connected to the first rinsing chamber, 207. First filtration apparatus 209 has a residue tube, 213, that is connected to the first rinsing chamber, 207, and a permeate collection tube, 211.

Another chamber, 215, is a second reaction chamber located after the first rinsing chamber, 207, and contains a second liquid solution comprising a second reagent and a solvent.

Chamber 217 is a second rinsing chamber located after the second rinsing chamber, 215. Second rinsing chamber 217 contains a second rinsing solution comprising a solvent. A second filtration apparatus, 219, is connected to the second rinsing chamber, 217. Second filtration apparatus 219 has a residue tube, 223, that is connected to the second rinsing chamber, 217, and a permeate collection tube, 221.

System 200 further comprises valves 225a-d located on each of the chambers. 205, 207, 215, and 217, respectively. The valves. 225a-d, are connected to a replenishing source (not shown), which provide, when needed, additional first liquid solution, second liquid solution, first reagent, second reagent, or solvent, as in the case for first and second chambers 215 and 215, respectively, or more first rinsing solution or second rinsing solution, as in the case of first and second rinsing chambers, 207 and 217, respectively. Valves 225a-d may be electrically-actuated and opened by the triggering of a sensor (not shown), which is adapted to monitor or measure the volume or concentration of liquid solution in a chamber. The sensors may be dipped into the liquid solution of each chamber.

In operation, a first portion of an electrode, 203, is first placed on a first roller, 202a, which is part of conveying apparatus 201. Typically, the first portion is attached, such as by glue or tape, to a leader material that is strung through the rest of rollers 202b-i. In this way, the leader material can guide the electrode through the conveying apparatus, 201, during the process. The leader material may then be removed from the electrode once the portion of the electrode that was placed on roller 202a is conveyed to roller 202i or when coating of the entire electrode is completed. An example of such a leader material may be from a previous roll of electrode. In advance of the coating of a specific electrode, the previous roll of electrode e may have had a long trailing length with no active material (just foil). Once the previous roll has been processed, this remnant is left strung on the conveying apparatus, and the active material can be slit and removed. The remnant will then act as a leader to guide the next roll of electrode through the conveying apparatus.

Accordingly, the first portion of the electrode, 203, is conveyed into first reaction chamber 205 by movement of second roller 202b, which is also located within first reaction chamber 205. First portion of electrode 203 is exposed within first reaction chamber 205 to a first liquid solution to produce a self-limiting layer comprising an adsorbed first reagent on the surface of the first portion of the electrode. The first portion of electrode. 203, is left in first reaction chamber 205 for a certain residence time in order for the reaction to take place. Once the reaction is substantially completed, the first portion of electrode 203 is withdrawn from first reaction chamber 205 by moving upward to third roller 202c.

While this is occurring, a second portion of electrode 203 is conveyed into first reaction chamber 205. Conveying apparatus operates in a continuous manner until the desired amount of electrode is coated with thin film.

Returning back to the first portion of electrode 203, the first portion is then conveyed to a first rinsing chamber, 207 by movement of fourth roller 202d, which is also located within first rinsing chamber 207. The first rinsing chamber, 207, contains a first rinsing solution comprising a first solvent for rinsing the electrode 203 to produce a saturated first layer on the electrode and a first residual solution comprising the first solvent and unreacted first reagent.

The system may also comprise a filtration apparatus for separating unreacted reagent front the solvent in the first and second rinsing solutions. The filtration apparatus may be any device that can perform such a separation. Preferably, the filtration apparatus is selected from one of the following, a membrane, a filtration column, or a chromatographic column, a chemical or electrochemical separation tank, or an adsorption column.

When needed, the first rinsing solution is passed to first filtration apparatus 209 to separate the unreacted first reagent from the first solvent. The first filtration apparatus, 209, produces a permeate stream enriched in unreacted first reagent and depleted in first solvent and a residue stream enriched in first solvent and depicted in unreacted first reagent compared to the first rinsing solution. The permeate stream is collected in permeate collection tube 211, which may be recycled or sent back to the first reaction chamber, 205. The residue stream is recycled back to the first rinsing chamber, 207, via residue tubing 213. Filtration apparatus, 209, may operate periodically or continuously. From the first rinsing chamber 207, the first portion of electrode 203 is then withdrawn from first rinsing chamber 207 by moving upward to fifth roller 202e.

First portion of electrode 203 is then conveyed into second reaction chamber 215, by moving downward to sixth roller 202f, which is also located within second reaction chamber 215. Second reaction chamber 215 comprises a second liquid solution comprising at least a second reagent. Within second reaction chamber 215, the electrode, 203, is exposed to the second liquid solution, which reacts with the first adsorbed reagent to produce a monolayer of thin film coated onto the surface of the electrode. After the reaction is substantially completed, the first portion of electrode 203 is then withdrawn from second reaction chamber 215 by moving upward to seventh roller 202g.

Next, first portion of electrode 203 is conveyed to a second rinsing chamber, 217, by moving downward to eighth roller 202h, which is also located within second rinsing chamber 217. The second rinsing chamber, 217, contains a second rinsing solution comprising a second solvent for rinsing the electrode to produce a purified monolayer of thin film coated onto the surface of the electrode, 203, and a second residual solution comprising the second solvent and unreacted second reagent.

Similar to the first rinsing solution, the second rinsing solution may be sent to a second filtration apparatus, 219. Second filtration apparatus 219 produces a permeate stream enriched in unreacted second reagent and depleted in second solvent and a residue stream enriched in second solvent and depleted in unreacted second reagent compared to the second rinsing solution. The permeate stream is collected in permeate collection tube 221, which may be recycled or sent back to the second reaction chamber, 215. The residue stream is recycled back to the second rinsing chamber, 217, via residue tubing 223. Filtration apparatus. 219, may operate periodically or continuously.

Finally, first portion of electrode 203 is withdrawn from second rinsing chamber 217 being conveyed up to ninth roller 202i. From here, the first portion may be collected or rolled up until the rest of the desired portions of the electrode are coated with a thin film.

A similar embodiment of the present disclosure to that described in FIG. 2 can involve replacement of bath-deposition reaction chambers 205 and 215 with slot-die or gravure coating reaction chambers (not shown). In such an embodiment, rinse chambers 207 and 217 may or may not be present, depending on the need for a rinse step. In such an embodiment or even in the embodiment described in FIG. 2, an excess solution removal technique such as an air knife, doctor blade, metering knife or similar can be employed in lieu of a rinse step. In another similar embodiment, 215 may be entirely absent, as the entire deposition reaction may be performed in 205. As such, the apparatus of the present disclosure, both in terms of deposition equipment and conveying equipment, can be considered to be modular and assembled in any specific manner so as to facilitate a specific solution-deposition process.

Methods of the present disclosure can be implemented using, or with the aid of, computer systems. The computer system can be involved in many different aspects of the operation the present methods, including but not limited to, the regulation of various aspects of the conveyance apparatus, such as by directing movement of the conveyance apparatus by moving the component to be coated into and out of the reaction chambers; by controlling the timing of the opening and closing of valves; detecting the volume of liquid via sensor readings, directing the flow of liquids, such as reagents and buffers, into the reaction chambers; and regulating pumps. In some aspects, the computer system is implemented to automate the methods and systems disclosed herein.

The computer system may include a central processing unit (CPU, also "processor" and "computer processor" herein), which can be a single core or multi core processor, or a plurality of processors for parallel processing. The computer system may also include memory or memory location (e.g., random-access memory, read-only memory, flash memory), electronic storage unit (e.g., hard disk), communication interface (e.g., network adapter) for communicating with one or more other systems, and peripheral devices, such as cache, other memory, data storage and/or electronic display adapters. The memory, storage unit, interface and peripheral devices are in communication with the CPU through a communication bus (solid lines), such as a motherboard. The storage unit can be a data storage unit (or data repository) for storing data. The computer system can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The CPU can execute a sequence of machine-readable instructions, which can be embodied in a program or software. The instructions may be stored in a memory location, such as the memory. Examples of operations performed by the CPU can include fetch, decode, execute, and writeback.

The storage unit can store files, such as drivers, libraries and saved programs. The storage unit can store programs generated by users and recorded sessions, as well as output (s) associated with the programs. The storage unit can store user data, e.g., user preferences and user programs. The computer system in some cases can include one or more additional data storage units that are external to the computer system, such as located on a remote server that is in communication with the computer system through an intranet or the Internet.

The computer system can communicate with one or more remote computer systems through the network. For instance, the computer system 401 can communicate with a remote computer system of a user (e.g., operator). Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory or electronic storage unit. The machine executable or machine readable code can be provided in the form of software. During use, the code can be executed by the processor. In some cases, the code can be retrieved from the storage unit and stored on the memory for ready access by the processor 405. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a precompiled or as-compiled fashion.

Aspects of the systems and methods provided herein, such as the computer system, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution. Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) for providing, for example, one or more results of sample analysis. Examples of UFs include, without limitation, a graphical user interface (GUI) and web-based user interface.

The methods and systems provided above are now further described by the following examples, which are intended to be illustrative, but are not intended to limit the scope or underlying principles in any way.

EXAMPLES

Example 1: Deposition of $TiO_2$

Titanium isopropoxide is first dissolved in an appropriate anhydrous solvent, such as dry isopropyl alcohol, is adsorbed onto electrode surface. The component to be coated (such as an electrode) is then cleansed of excess, non-adsorbed titanium isopropoxide using a rinse solvent. Next, the electrode is introduced to a solution of an oxidizer, such as water, dissolved in an appropriate solvent, such as isopropyl alcohol. Hydrolysis results in loss of alkoxide ligand to 2-propanol, leaving an adsorbed moiety with added hydroxyl. In a fourth step, excess solution of water and solvent is removed by a rinse solvent. A single monolayer of titanium oxide is produced. The process may be repeated to yield increasing thickness.

Example 2: Deposition of CdS

Cadmium sulfate (CdSO) is first dissolved in an aqueous solution, yielding $Cd^{2+}$ ions adsorbed onto a surface of an electrode. The electrode is cleansed of excess, non-adsorbed $Cd^{2+}$. The electrode is then introduced to an aqueous solution containing an anionic sulfur precursor, such as thiourea or $Na_2S$. The pH of the precursor solutions may be varied to control rate of reaction. The high solubility product constant of CdS in this reaction results in the precipitation of a single monolayer of CdS on the electrode surface, where surface energy minimization promotes nucleation.

Example 3: Deposition of TiN

An electrode (or other component to be coated) is submerged or exposed to a solution of titanium ethoxide dissolved anhydrous ethanol. The electrode is cleansed of excess precursor. The electrode is exposed to a solution containing a nitrogen precursor, such as ammonia in pyridine or hydrazine in THF. Reaction of precursor with adsorbed titanium ethoxide results in a single monolayer of TiN.

Example 4: Coating Thin Films on Graphite Anodes

Figure 3A:
FIGS. 3A-3B are images magnified to 60k× of a graphite electrode surface showing the difference in surface morphology between pristine, uncoated graphite (FIG. 3A) and graphite coated with a method in accordance with the disclosure (FIG. 3B).
Figure 3B:
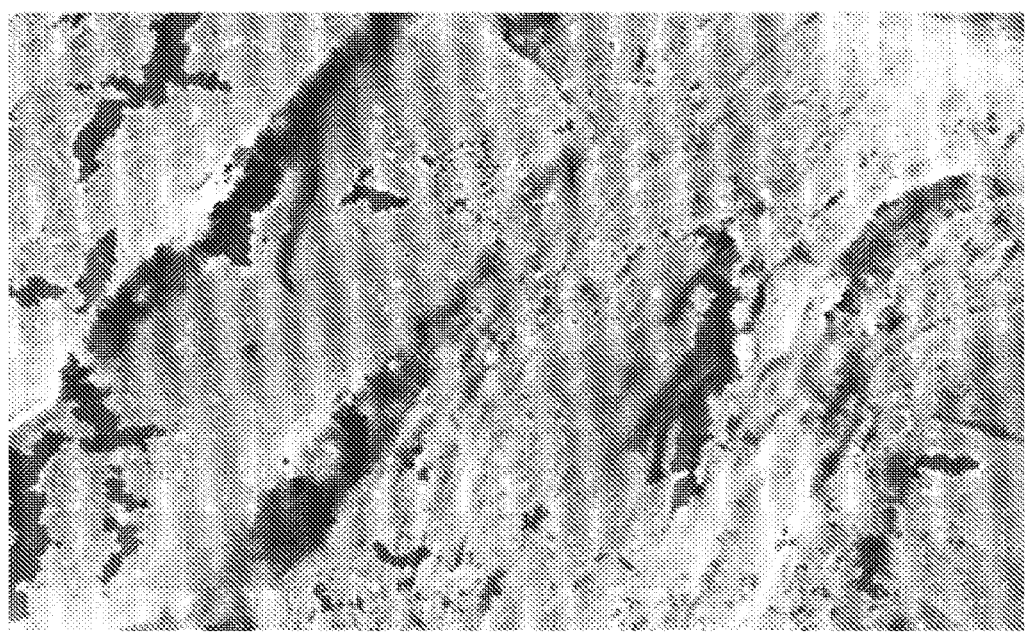

Coating processes were performed on graphite anodes. Scanning electron microscopy with energy dispersive X-ray spectroscopy (SEM-EDX) was employed to prove the presence of coating. SEM images showed a distinct change in the morphology of the surface of graphite anodes from before to after coating (FIGS. 3A-3B). EDX measurement of the local Al and O signals then confirmed that the coating material was in fact, $Al_2O$. The measurement of ~0.9 atomic % Al via EDX is in the range of EDX signals of Al observed in ~1 nm ALD-coated graphite anodes demonstrated in literature. As such, the solution coated $Al_2O_3$ can be concluded to be within the range of coating thicknesses deposited via ALD in literature.

Example 5: Generating Graphite-Li Half-Cells

Figure 4:
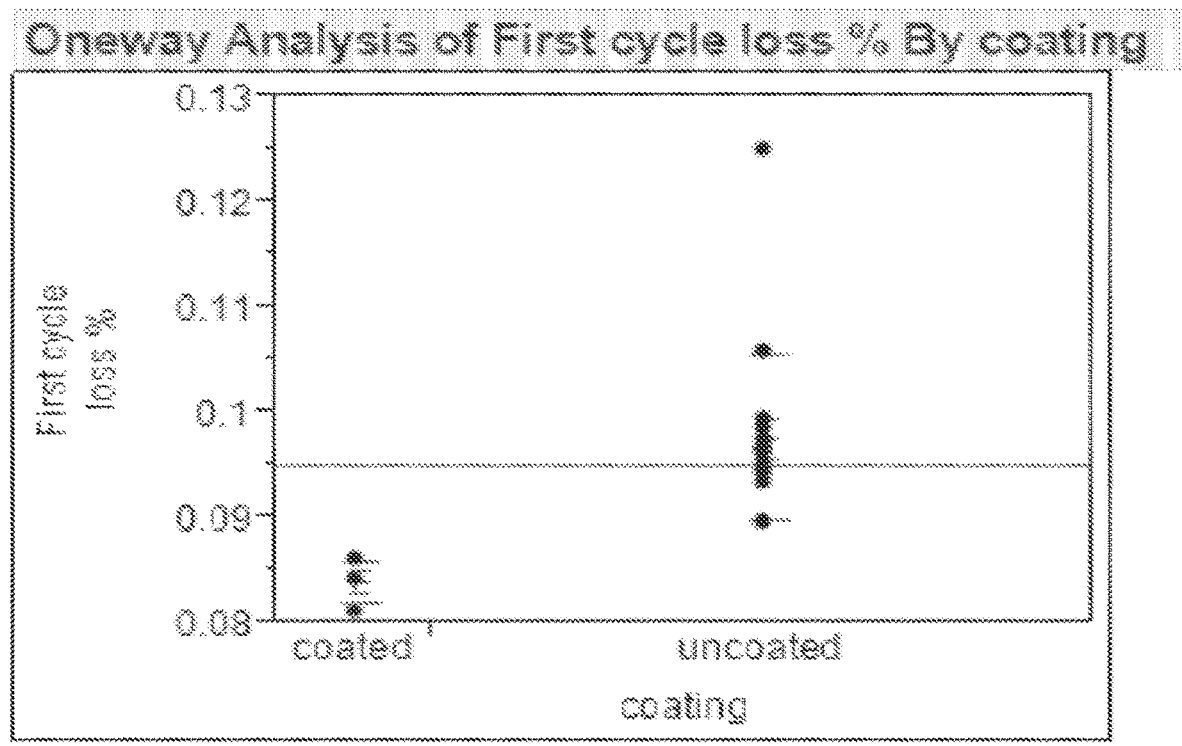
FIG. 4 is a scatter plot showing one-way first cycle loss of coated versus uncoated electrodes.
Figure 5:
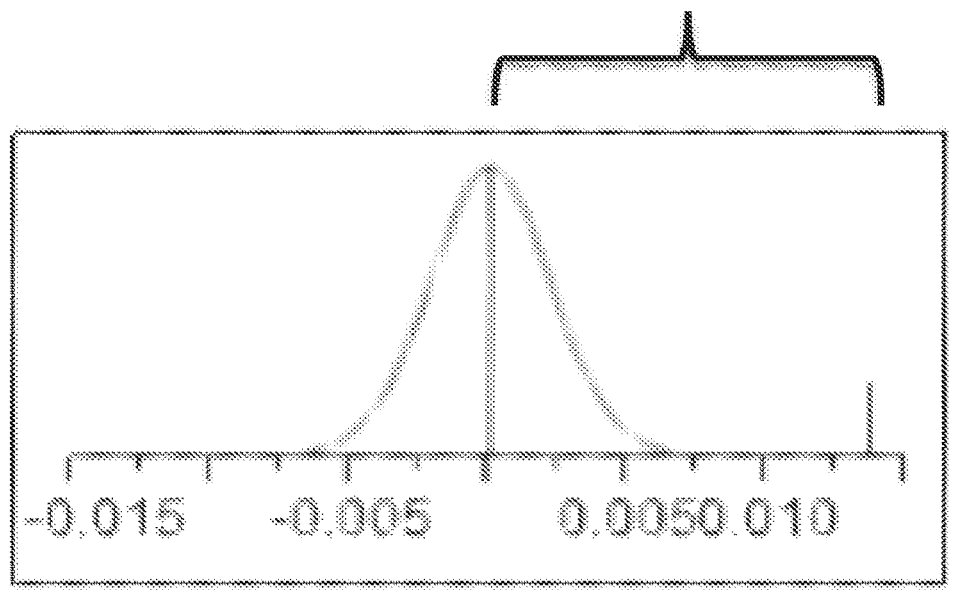
FIG. 5 is a t-test graph showing significant difference to 95% confidence in first cycle capacity loss between coated and uncoated anodes due to presence of the coating.

Coated graphite anodes were paired with Li foils to generate graphite-Li half-cells. Half-cells are ideal for generating precise data regarding the irreversible capacity loss to form SEI on graphite. Rapid cycles of learning were also achievable given that only one charge-discharge cycle was necessary to measure first cycle capacity loss. As can be seen from FIGS. 4-5 and Table 1, a statistically significant (to 95% confidence) difference of 1.37% in mean first cycle loss was achieved when comparing $Al_2O_3$-coated anodes to control.

TABLE 1

Means and Std Deviations

| Level | Number | Mean | Std Dev | Std Err Mean | Lower 95% | Upper 95% |
|---|---|---|---|---|---|---|
| coated | 4 | 0.084 | 0.002 | 0.001 | 0.081 | 0.087 |
| uncoated | 17 | 0.098 | 0.008 | 0.002 | 0.093 | 0.102 | t-Test
uncoated-coated (assuming unequal variances)

| | | | |
|---|---|---|---|
| Difference | 0.014 | t ratio | 6.282 |
| Std Err Diff | 0.002 | DF | 18.515 |
| Upper CL Dif | 0.018 | Prob > \|t\| | <0.0001 |
| Lower CL Dif | 0.01 | Prob > t | <0.0001 |
| Confidence | 0.95 | Prob < t | 1 |

Figure 6:
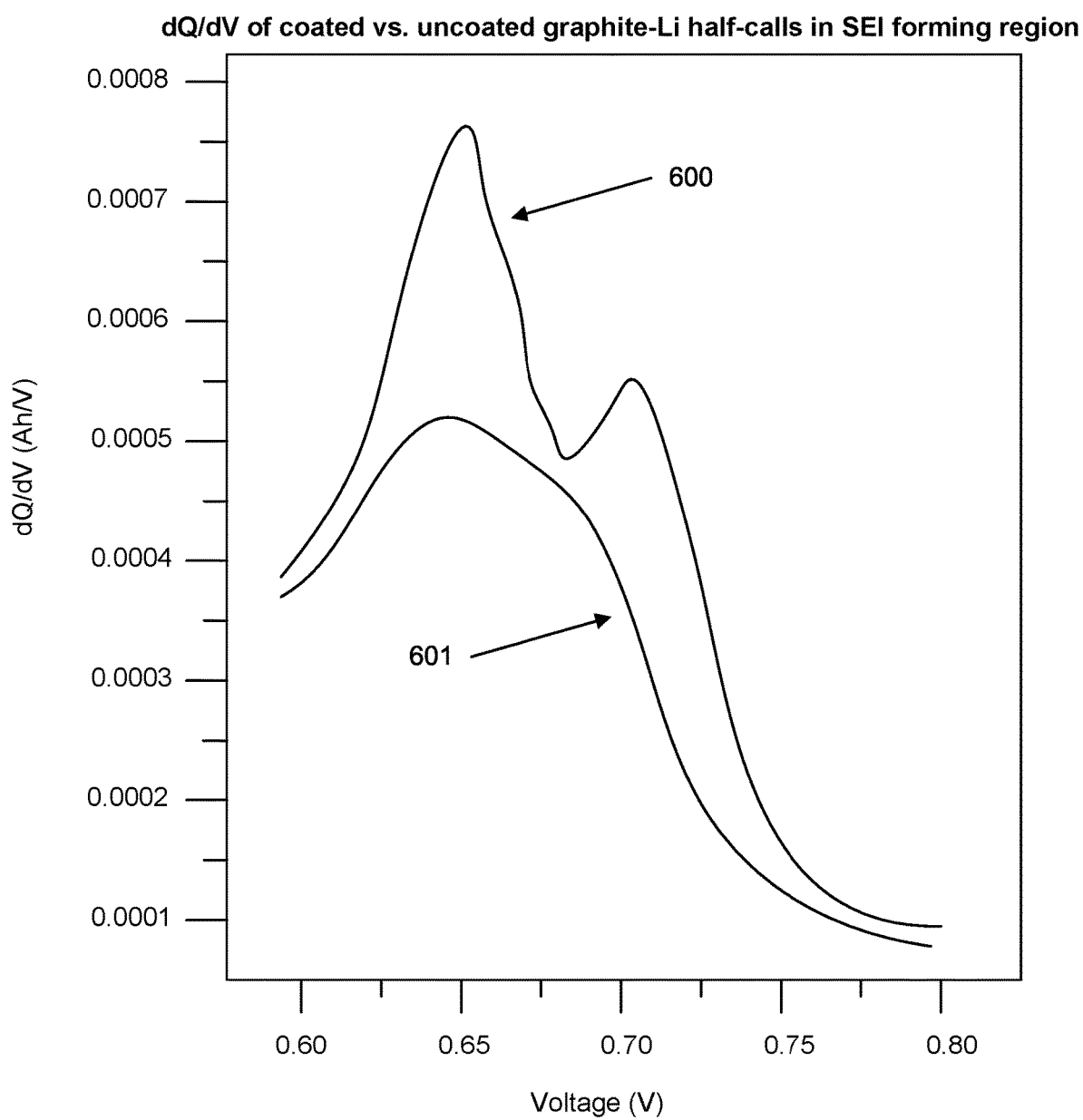
FIG. 6 is a graph showing the change in differential charge/differential voltage (dQ/dV) over voltage for an uncoated graphite anode (600) versus a coated graphite anode (601).

By plotting the differential charge/differential voltage (dQ/dV) vs half-cell voltage, it is possible to identify exactly the amount of charge transferred during the typical SEI formation voltages near 0.6-0.8V. As can be seen from FIG. 6, the differential charge from SE generation is lower for coated half-cells (601) as opposed to uncoated (600), which is a clear indication that the SEI generation was suppressed by the coating.

It should be understood from the foregoing that, while particular implementations have been illustrated and described, various modifications can be made thereto and are contemplated herein. It is also not intended that the present disclosure be limited by the specific examples provided within the specification. While certain embodiments have been described with reference to the aforementioned specification, the descriptions and illustrations of the preferable embodiments herein are not meant to be construed in a limiting sense. Furthermore, it shall be understood that all aspects of the present disclosure are not limited to the specific depictions, configurations or relative proportions set forth herein which depend upon a variety of conditions and variables. Various modifications in form and detail of the embodiments will be apparent to a person skilled in the art. It is therefore contemplated that the present disclosure shall also cover any such modifications, variations and equivalents.

The invention claimed is:

1. A system for coating a thin film onto a lithium-ion battery electrode, comprising:
a plurality of chambers, the plurality of chambers including:
a first reaction chamber configured to apply a first solution to active material of the lithium-ion battery electrode, the first solution including at least a first reagent that reacts with the active material of the lithium-ion battery electrode to produce a partially coated lithium-ion battery electrode having a layer comprising an adsorbed first reagent on a surface of the active material of the lithium-ion battery electrode;
a first rinsing chamber coupled to the first reaction chamber, wherein a first rinsing solution comprising a first rinsing solvent is applied to the partially coated lithium-ion battery electrode in the first rinsing chamber;
a second reaction chamber configured to apply a second solution to the partially coated lithium-ion battery electrode, the second solution including at least a second reagent that is different from the first reagent and that reacts with the adsorbed first reagent bonded onto the surface of the active material of the partially coated lithium-ion battery electrode to produce a fully coated lithium ion battery electrode having an artificial solid electrolyte interphase (SEI) comprising a monolayer of thin film coated onto the surface of the active material, the monolayer of thin film comprising a compound generated from a reaction of the second reagent and the adsorbed first reagent;
a second rinsing chamber coupled to the second reaction chamber, wherein a second rinsing solution comprising a second rinsing solvent is applied to the fully coated lithium ion battery electrode in the second rinsing chamber;
one or more filtration apparatuses coupled to the first rinsing chamber and the second rinsing chamber, wherein the one or more filtration apparatuses separate an amount of the first rinsing solvent and an amount of the second rinsing solvent from unreacted first reagent and unreacted second reagent and recycle the amount of the first rinsing solvent to the first rinsing chamber and the amount of the second rinsing solvent to the second rinsing chamber; and
a conveyance apparatus including a series of rollers for conveying the lithium-ion battery electrode to the first reaction chamber and to the second reaction chamber.

2. The system of claim 1, wherein:
the first reaction chamber holds a quantity of the first solution and the conveyance apparatus causes the active material of the lithium-ion battery electrode to be immersed in the quantity of the first solution; and
the second reaction chamber holds a quantity of the second solution and the conveyance apparatus causes the partially coated lithium-ion battery electrode to be immersed in the quantity of the second solution.

3. The system of claim 1, wherein:
the first solution is applied to the active material of the lithium-ion battery electrode by spraying the active material of the lithium-ion battery electrode with the first solution in the first reaction chamber; and
the second solution is applied to the lithium-ion battery electrode by spraying the partially coated lithium ion battery electrode with the second reagent in the second reaction chamber.

4. The system of claim 1, comprising a die coater to dispense the first solution onto the active material of the lithium-ion battery electrode.

5. The system of claim 1, comprising a gravure roller to apply the first solution to the active material of the lithium-ion battery electrode.

6. The system of claim 2, wherein:
the lithium-ion battery electrode is a sheet or a foil;
a first portion of the lithium-ion battery electrode is coupled to a leader material to guide the lithium-ion battery electrode through the conveyance apparatus; and the leader material is free of lithium-ion battery electrode active material.

7. The system of claim 1, wherein the one or more filtration apparatuses include a first filtration apparatus coupled to the first rinsing chamber and a second filtration apparatus coupled to the second rinsing chamber.

8. The system of claim 7, wherein the first filtration apparatus produces a first permeate stream that is enriched in the first rinsing solvent and depleted in the unreacted first reagent.

9. The system of claim 8, wherein the first permeate stream is provided directly to the first rinsing chamber.

10. The system of claim 1, comprising a first roller disposed above the first reaction chamber, a second roller disposed within the first reaction chamber, and a third roller disposed between the first reaction chamber and the first rinsing chamber and above the first reaction chamber and the first rinsing chamber;
wherein the first roller operates in conjunction with the second roller to cause the active material of the lithium-ion battery electrode to move down into the first reaction chamber for a residence time and the second roller operates in conjunction with the third roller to cause the partially coated lithium-ion battery electrode to move upward and out of the first reaction chamber.

11. The system of claim 7, wherein the first filtration apparatus operates using at least one of membrane separation, chemical precipitation, ion-exchange, electrochemical removal, physical adsorption, or flow filtration chromatography.

12. The system of claim 8, wherein the second filtration apparatus produces a second permeate stream enriched in the second rinsing solvent and depleted in unreacted second reagent.

13. The system of claim 12, wherein the second permeate stream is provided directly to the second rinsing chamber.

14. The system of claim 12, wherein the second solution is an ionic solution and the second filtration apparatus comprises a filtration column.

15. The system of claim 12, wherein the first filtration apparatus implements a first filtration technique to filter the first reagent from the first rinsing solvent and the second filtration apparatus implements a second filtration technique different from the first filtration technique to filter the second reagent from the second rinsing solvent.

16. The system of claim 10, comprising a fourth roller disposed within the first rinsing chamber, a fifth roller disposed between the first rinsing chamber and the second reaction chamber and above the first rinsing chamber and the second reaction chamber; and a sixth roller disposed within the second reaction chamber; and wherein:
the third roller operates in conjunction with the fourth roller to cause the partially coated lithium-ion battery electrode to move downward into the first rinsing chamber;
the fourth roller and the fifth roller cause the partially coated lithium-ion battery electrode to move upward and out of the first rinsing chamber; and
the fifth roller and the sixth roller cause the partially coated lithium-ion battery electrode to move downward into the second reaction chamber for an additional residence time to produce the fully coated lithium ion battery electrode having the artificial SEI.

17. The system of claim 1, comprising:
a first sensor to determine an amount of the first solution in the first reaction chamber;
a second sensor to determine an amount of the second solution in the second reaction chamber;
a first valve for regulating the amount of the first solution in the first reaction chamber;
a second valve for regulating the amount of the second solution in the second reaction chamber;
at least one pump to provide the first solution to the first reaction chamber and the second solution to the second reaction chamber;
a motor for driving the conveyance apparatus; and
a computer for operating the conveyance apparatus.

18. The system of claim 1, wherein the compound generated by the reaction of the adsorbed first reagent and the second reagent comprises one or more transition metal dichalcogenides.

19. The system of claim 1, wherein the compound generated by the reaction of the adsorbed first reagent and the second reagent comprises at least one of polyethylene oxide (PEO), poly vinyl alcohol (PVA), poly methyl methacrylate (PMMA), poly dimethyl siloxane (PDMS), or poly vinyl pyrrolidone (PVP).

20. The system of claim 1, wherein the artificial SEI does not contribute to inter-particle resistance and the compound generated by the reaction of the adsorbed first reagent and the second reagent is selected from one of the following:
(a) binary oxides of type $A_xO_y$, where A is an alkali metal, alkali-earth metal, transition metal, semimetal or metalloid and x and y are stoichiometric coefficients;
(b) ternary oxides of type $A_xB_yO_z$, where A and B are any combination of alkali metal, alkali-earth metal, transition metal, semimetal or metalloid and x, y and z are stoichiometric coefficients;
(c) quaternary oxides of type $A_wB_xC_yO_z$, where A, B and C are any combination of alkali metal, alkali-earth metal, transition metal, semimetal or metalloid and w, x, y and z are stoichiometric coefficients;
(d) binary halides of type $A_xB_y$, where A is an alkali metal, alkali-earth metal, transition metal, semimetal or metalloid, B is a halogen and x and y are stoichiometric coefficients;
(e) ternary halides of type $A_xB_yC_z$, where A and B are any combination of alkali metal, alkali-earth metal, transition metal, semimetal or metalloid, C is a halogen and x, y and z are stoichiometric coefficients;
(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
(g) binary nitrides of type $A_xN_y$, where A is an alkali metal, alkali-earth metal, transition metal, semimetal or metalloid and x and y are stoichiometric coefficients;
(h) ternary nitrides of type $A_xB_yN_z$, where A and B are any combination of alkali metal, alkali-earth metal, transition metal, semimetal or metalloid and x, y and z are stoichiometric coefficients;
(i) quaternary nitrides of type $A_wB_xC_yN_z$, where A, B and C are any combination of alkali metal, alkali-earth metal, transition metal, semimetal or metalloid and w, x, y and z are stoichiometric coefficients;
(j) binary chalcogenides of type $A_xB_y$, where A is an alkali metal, alkali-earth metal, transition metal, semimetal or metalloid, B is a chalcogen and x and y are stoichiometric coefficients;
(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;

(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;

(m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y is a stoichiometric coefficient;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A, B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

* * * * *